United States Patent
Logan

(10) Patent No.: US 8,277,984 B2
(45) Date of Patent: Oct. 2, 2012

(54) SUBSTRATE-ENHANCED MICROBIAL FUEL CELLS

(75) Inventor: Bruce Logan, State College, PA (US)

(73) Assignee: The Penn State Research Foundation, University Park, PA (US)

(*) Notice: Subject to any disclaimer, the term of this patent is extended or adjusted under 35 U.S.C. 154(b) by 1537 days.

(21) Appl. No.: 11/799,149

(22) Filed: May 1, 2007

(65) Prior Publication Data

US 2007/0259216 A1    Nov. 8, 2007

Related U.S. Application Data

(60) Provisional application No. 60/796,761, filed on May 2, 2006.

(51) Int. Cl.
*H01M 8/16* (2006.01)
*H01M 8/22* (2006.01)

(52) U.S. Cl. ......................................... 429/401; 429/502

(58) Field of Classification Search ......................... None
See application file for complete search history.

(56) References Cited

U.S. PATENT DOCUMENTS

| | | | |
|---|---|---|---|
| 4,362,790 A | 12/1982 | Blanchart et al. | |
| 4,652,501 A | 3/1987 | Bennetto et al. | |
| 4,891,404 A | 1/1990 | Narayan et al. | |
| 5,256,501 A | 10/1993 | Hasvold et al. | |
| 5,427,871 A | 6/1995 | Garshol et al. | |
| 5,683,558 A | 11/1997 | Sieck et al. | |
| 5,723,098 A | 3/1998 | Salzburg et al. | |
| 5,976,719 A | 11/1999 | Kim et al. | |
| 6,090,266 A | 7/2000 | Roychowdhury | |
| 6,217,822 B1 | 4/2001 | Borglum | |
| 6,294,281 B1* | 9/2001 | Heller | 429/401 |
| 6,887,692 B2 | 5/2005 | Paterek | |
| 7,226,675 B2 | 6/2007 | Ovshinsky et al. | |

(Continued)

FOREIGN PATENT DOCUMENTS

KR    1020080066460    7/2008

(Continued)

OTHER PUBLICATIONS

Oh, S. and B.E. Logan. "Proton exchange membrane and electrode surface areas as factors that affect power generation in microbial fuel cells." Applied Microbiology and Biotechnology 2006, vol. 70, pp. 162-169.

(Continued)

*Primary Examiner* — Raymond Alejandro
*Assistant Examiner* — Adam A Arciero
(74) *Attorney, Agent, or Firm* — Gifford, Krass, Sprinkle, Anderson & Citkowski, P.C.

(57) ABSTRACT

A microbial fuel cell configuration of the invention includes a substrate particularly formulated for a microbial fuel cell configured to produce electricity and/or a modified microbial fuel cell configured to produce hydrogen. A substrate formulation according to one embodiment includes a solid biodegradable organic material in a package porous to bacteria. A microbial fuel cell provided according to embodiments of the present invention includes an anode, a cathode, an electrically conductive connector connecting the anode and the cathode, a housing for an aqueous medium, the aqueous medium in contact with the anode, and a solid form of a biodegradable organic substrate disposed in the aqueous medium, the solid form of a biodegradable organic substrate formulated to support electron generation and transfer to the anode by anodophilic bacteria over a selected minimum period of time.

7 Claims, 6 Drawing Sheets

U.S. PATENT DOCUMENTS

| | | | |
|---|---|---|---|
| 7,491,453 | B2 | 2/2009 | Logan et al. |
| 2002/0025469 | A1 | 2/2002 | Heller |
| 2004/0094406 | A1 | 5/2004 | Sawada |
| 2005/0074663 | A1* | 4/2005 | Farneth et al. ............... 429/44 |
| 2005/0095466 | A1 | 5/2005 | Minteer et al. |
| 2005/0161342 | A1 | 7/2005 | Carson et al. |
| 2006/0011489 | A1 | 1/2006 | Swanepoel et al. |
| 2006/0011491 | A1* | 1/2006 | Logan et al. ............... 205/637 |
| 2006/0147763 | A1 | 7/2006 | Angenent et al. |
| 2006/0160200 | A1 | 7/2006 | Rathenow et al. |
| 2006/0172186 | A1 | 8/2006 | Tender |
| 2006/0234110 | A1 | 10/2006 | Bergel |
| 2006/0251959 | A1 | 11/2006 | Karamanev |
| 2007/0042480 | A1 | 2/2007 | Rozendal et al. |
| 2007/0062820 | A1 | 3/2007 | Smotkin |
| 2007/0172710 | A1 | 7/2007 | Kruesi |
| 2007/0259216 | A1 | 11/2007 | Logan |
| 2007/0259217 | A1 | 11/2007 | Logan |
| 2008/0220292 | A1 | 9/2008 | Rabaey et al. |
| 2008/0251445 | A1 | 10/2008 | Kamleiter et al. |
| 2008/0277273 | A1 | 11/2008 | Logan |
| 2008/0286624 | A1 | 11/2008 | Lovley et al. |
| 2008/0292912 | A1 | 11/2008 | Logan |
| 2009/0029198 | A1 | 1/2009 | Jin et al. |

FOREIGN PATENT DOCUMENTS

| | | | |
|---|---|---|---|
| WO | WO 9103079 | | 3/1991 |
| WO | WO-0139306 | | 5/2001 |
| WO | WO-2004/015172 | | 2/2004 |
| WO | WO2005/005981 | * | 1/2005 |
| WO | WO-2005005981 | | 1/2005 |
| WO | WO-2007/010313 | | 1/2007 |
| WO | WO-2007113314 | A1 | 10/2007 |
| WO | WO-2008/063843 | | 5/2008 |
| WO | WO-2008/109962 | | 9/2008 |

OTHER PUBLICATIONS

Logan, B., S. Cheng, V. Watson, and G. Estadt. "Graphite Fiber Brush Anodes for Increased Power Production in Air Cathode Microbial Fuel Cells." Environmental Science and Technology 2007, vol. 41, pp. 3341-3346.

Oh, S., B. Min, and B.E. Logan. "Cathode Performance as a Factor in Electricity Generation in Microbial Fuel Cells." Environmental Science and Technology 2004, vol. 38, pp. 4900-4904.

Liu, H., S. Cheng, and B.E. Logan. "Power Generation in Fed-Batch Microbial Fuel Cells as a Function of Ionic Strength, Temperature, and Reactor Configuration." Environmental Science and Technology 2005, vol. 39, pp. 5488-5493.

Cheng, S., H. Liu, and B. Logan. "Increased Power Generation in a Continuous Flow MFC with Adjective Flow through the Porous Anode and Reduced Electrode Spacing." Environmental Science and Technology 2006, vol. 40, pp. 2426-2432.

Logan, B.E., B. Hamelers, R. Rozendal, U. Schroder, J. Keller, S. Freguia, P. Aelterman, W. Verstraete, and K. Rabaey. "Microbial Fuel Cells: Methodology and Technology." Environmental Science and Technology 2006, vol. 40, pp. 5181-5192.

Cheng, S. and B.E. Logan. "Ammonia treatment of carbon cloth anodes to enhance power generation of microbial fuel cells." Electrochemistry Communications 2007, vol. 9, pp. 492-496.

Cheng, S., H. Liu, and B.E. Logan. "Power Densities Using Different Cathode Catalysts (Pt and CoTMPP) and Polymer Binders (Nafion and PTFE) in Single Chamber Microbial Fuel Cells." Environmental Science and Technology 2006, vol. 40, 364-369.

Cheng, S., H. Liu, and B.E. Logan. "Increased performance of single-chamber microbial fuel cells using an improved cathode structure." Electrochemistry Communications 2006, vol. 8, pp. 489-494.

Liu, H., S. Grot, and B.E. Logan. "Electrochemically Assisted Microbial Production of Hydrogen from Acetate." Environmental Science and Technology 2005, vol. 39, pp. 4317-4320.

Liu, H. and B.E. Logan. "Electricity Generation Using an Air-Cathode Single Chamber Microbial Fuel Cell in the Presence and Absence of a Proton Exchange Membrane." Environmental Science and Technology 2004, vol. 38, pp. 4040-4046.

Liu, H., R. Ramnarayanan, and B.E. Logan. "Production of Electricity during Wastewater Treatment Using a Single Chamber Microbial Fuel Cell." Environmental Science and Technology 2004, vol. 38, pp. 2281-2285.

Liu, H., S. Cheng, and B.E. Logan. "Production of Electricity from Acetate or Butyrate Using a Single-Chamber Microbial Fuel Cell." Environmental Science and Technology 2005, vol. 39, pp. 658-662.

Kim, J.R., S. Cheng, S. Oh, and B.E. Logan. "Power Generation Using Different Cation, Anion, and Ultrafiltration Membranes in Microbial Fuel Cells." Environmental Science and Technology 2007, vol. 41, pp. 1004-1009.

Zuo, Y., P. Maness, and B.E. Logan. "Electricity Production from Steam-Exploded Corn Stover Biomass." Energy and Fuels 2006, vol. 20, 1716-1721.

Kim, J.R., B. Min, and B.E. Logan. "Evaluation of procedures to acclimate a microbial fuel cell for electricity production." Applied Microbiology and Biotechnology 2005, vol. 68, pp. 23-30.

Logan, B.E. and J.M. Regan. "Electricity-producing bacterial communities in microbial fuel cells." TRENDS in Microbiology 2006, vol. 14, No. 12, pp. 512-518.

Chiou, C.T. and D.E. Kile. "Contaminant Sorption by Soil and Bed Sediment." U.S. Department of the Interior, U.S. Geological Survey: Reston, VA, 2000.

Rabaey, K., K. Van de Sompel, L. Maignien, N. Boon, P. Aelterman, P. Clauwaert, L. de Schamphelaire, H.T. Pham, J. Vermeulen, M. Verhaege, P. Lens, and W. Verstraete. "Microbial Fuel Cells for Sulfide Removal." Environmental Science and Technology 2006, vol. 40, pp. 5218-5224.

Reimers, C.E., L.M. Tender, S. Fertig, and W. Wang. "Harvesting Energy from the Marine Sediment-Water Interface." Environmental Science and Technology 2001, vol. 35, pp. 192-195.

Finkelstein, D.A., L.M. Tender, and J.G. Zeikus. "Effect of Electrode Potential on Electrode-Reducing Microbiota." Environmental Science and Technology 2006, vol. 40, pp. 6990-6995.

He, Z., N. Wagner, S.D. Minteer, and L.T. Andenent. "An Upflow Microbial Fuel Cell with an Interior Cathode: Assessment of the Internal Resistance by Impedance Spectroscopy" Environmental Science and Technology 2006, vol. 40, pp. 5212-5217.

Cai, M., J. Liu, and Y. Wei. "Enhanced Biohydrogen Production from Sewage Sludge with Alkaline Pretreatment." Environmental Science and Technology 2004, vol. 38, pp. 3195-3202.

Hasvold, O., H. Henriksen, E. Melvaer, G. Citi, B.O. Johansen, T. Kjonigsen, R. Galetti. "Sea-water battery for subsea control systems." Journal of Power Sources 1997, vol. 65, pp. 253-261.

Hasvold, O. and N. Storkersen. "Electrochemical power sources for unmanned underwater vehicles used in deep sea survey operations." Journal of Power Sources 2001, vol. 96, pp. 252-258.

Cooper, K.R. and M. Smith. "Electrical test methods for on-line fuel cell ohmic resistance measurement." Journal of Power Sources 2006, vol. 160, pp. 1088-1095.

Tender, L.M., C.E. Reimers, H. A. Stecher III, D.E. Holmes, D.R. Bond, D.A. Lowy, K. Pilobello, S.J. Fertig, and D.R. Lovley. "Harnessing microbially generated power on the seafloor." Nature Biotechnology 2002, vol. 20, pp. 821-825.

Chaudhuri, S.K. and D.R. Lovley. "Electricity generation by direct oxidation of glucose in mediatorless microbial fuel cells." Nature Biotechnology 2003, vol. 21, pp. 1229-1232.

Lovley, D.R. "Microbial Energizers: Fuel Cells That Keep on Going." Microbe 2006, vol. 1, pp. 323-329.

Lowy, D.A., L.M. Tender, J.G. Zeikus, D.H. Park, D.R. Lovley. "Harvesting energy from the marine sediment—water interface II Kinetic activity of anode materials." Biosensors and Bioelectronics 2006, vol. 21, pp. 2058-2063.

Brennan, R.A., R.A. Sanford, and C.J. Werth. "Chitin and corncobs as electron donor sources for the reductive dechlorination of tetrachloroethene." Water Research 2006, vol. 40, pp. 2125-2134.

Niessen, J., U. Schroder, M. Rosenbaum, F. Scholz. "Fluorinated polyanilines as superior materials for electrocatalytic anodes in bacterial fuel cells." Electrochemistry Communications 2004, vol. 6, pp. 571-575.

Park, D.H. and J.G. Zeikus. "Improved Fuel Cell and Electrode Designs for Producing Electricity from Microbial Degradation." Biotechnology and Bioengineering 2002, vol. 81, pp. 348-355.

Kim, N., Y. Choi, S. Jung, S. Kim. "Effect of Initial Carbon Sources on the Performance of Microbial Fuel Cells Containing Proteus vulgaris." Biotechnology and Bioengineering 2000, vol. 70, pp. 109-114.

Bond, D.R., D.E. Holmes, L.M. Tender, D.R. Lovley. "Electrode-Reducing Microorganisms that Harvest Energy from Marine Sediments." Science 2002, vol. 295, pp. 483-485.

Bond, D.R. and D.R. Lovley. "Electricity Production by Geobacter sulfurreducens Attached to Electrodes." Applied and Environmental Microbiology 2003, vol. 69, pp. 1548-1555.

Park, D.H. and J.G. Zeikus. "Electricity Generation in Microbial Fuel Cells Using Neutral Red as an Electronophore." Applied and Environmental Microbiology 2000, vol. 66, pp. 1292-1297.

Lovley, D.R. and D.J. Lonergan. "Anaerobic Oxidation of Toluene, Phenol, and p-Cresol by the Dissimilatory Iron-Reducing Organism, GS-15." Applied and Environmental Microbiology 1990, vol. 56, pp. 1858-1864.

Rabaey, K. G. Lissens, S.D. Siciliano, and W. Verstraete. "A microbial fuel cell capable of converting glucose to electricity at high rate and efficiency." Biotechnology Letters 2003, vol. 25, pp. 1531-1535.

Park, H.S., B.H. Kim, H.S. Kim, H.J. Kim, G.T. Kim, M. Kim, I.S. Chang, Y.K. Park, and H.I. Chang. "A Novel Electrochemically Active and Fe(III)-reducing Bacterium Phylogenetically Related to *Clostridium butyricum* Isolated from a Microbial Fuel Cell." Anaerobe 2001, vol. 7, pp. 297-306.

Park, D.H. and J.G. Zeikus. "Impact of electrode composition on electricity generation in a single-compartment fuel cell using *Shewanella putrefaciens*." Applied Microbiology and Technology 2002, vol. 59, pp. 58-61.

Raz, S., M.J.G. Jak, J. Schoonman, I. Reiss. "Supported mixed-gas fuel cells." Solid State Ionics 2002, vol. 149, pp. 335-341.

Reimers, C.E., P. Girguis, H.A.Stecher III, L.M. Tender, N. Ryckelynck, and P. Whaling. "Microbial Fuel Cell Energy from an Ocean Cold Seep." Geobiology 2006, vol. 4, pp. 123-136.

Kim, H.J., H. S. Park, M.S. Hyun, I.S. Chang, M. Kim, B.H. Kim. "A mediator-less microbial fuel cell using a metal reducing bacterium, *Shewanella putrefaciens*." Enzyme and Microbial Technology 2002, vol. 30, pp. 145-152.

Svitil, A.L. and D.L. Kirchman. "A chitin-binding domain in a marine bacterial chitinase and other microbial chitinases: implications for the ecology and evolution of 1, 4-β-glycanases." Microbiology 1998, vol. 144, pp. 1299-1308.

Lovley, D.R. and E.J. Phillips. "Novel Mode of Microbial Energy Metabolism: Organic Carbon Oxidation Coupled to Dissimilatory Reduction of Iron or Manganese." Applied and Environmental Microbiology 1988, vol. 54, pp. 1472-1480.

Allen, R.M. and H.P. Bennetto. "Microbial fuel-cells: electricity production from carbohydrates." Applied biochemistry and biotechnology 1993, vol. 39-40, pp. 27-40.

Logan, B. "Extracting Hydrogen and Electricity from Renewable Resources." Environmental Science and Technology 2004, pp. 160A-166A.

Grant, P.M. "Hydrogen lifts off—with a heavy load." Nature 2003, vol. 424, pp. 129-130.

Gross, R., M. Leach, A. Bauen. "Progress in renewable energy." Environment International 2003, vol. 29, pp. 105-122.

Nath, K. and D. Das. "Improvement of fermentative hydrogen production: various approaches." Applied Microbiology and Biotechnology 2004, vol. 65, pp. 520-529.

Miyake, J., M. Miyake, Y. Asada. "Biotechnological hydrogen production: research for efficient light energy conversion." Journal of Biotechnology 1999, vol. 70, pp. 89-101.

Woodward, J., M. Orr, K. Cordray, E. Greenbaum. "Enzymatic production of biohydrogen." Nature 2000, vol. 405, pp. 1014-1015.

Cheng, H., K. Scott, and C. Ramshaw. "Intensification of Water Electrolysis in a Centrifugal Field." Journal of the Electrochemical Society 2002, vol. 149, pp. D172-D177.

Logan, B.E., S. Oh, I.S. Kim, S. van Ginkel. "Biological Hydrogen Production Measured in Batch Anaerobic Respirometers." Environmental Science and Technology 2002, vol. 36, pp. 2530-2535.

Min, B. and B.E. Logan. "Continuous Electricity Generation from Domestic Wastewater and Organic Substrates in a Flat Plate Microbial Fuel Cell." Environmental Science and Technology 2004, vol. 38, pp. 5809-5814.

Logan, B.E., C. Murano, K. Scott, N.D. Gray, I.M. Head. "Electricity generation from cysteine in a microbial fuel cell." Water Research 2005, vol. 39, pp. 942-952.

Cheng, S., H. Liu, and B.E. Logan. "Optimization of Air Cathode used in One-Chamber Microbial Fuel Cells." (believed to have been offered for sale, publicly used, and/or published prior to the filed of this application).

Angement, L.T., K, Karim, M.H. Al-Dahhan, B.A. Wrenn, and R. Dominguez-Espinosa. "Production of bioenergy and biochemicals from industrial and agricultural wastewater." Trends in Biotechnology 2004, vol. 22, pp. 477-485.

He, Z., S.D. Minteer, and L.T. Angenent. "Electricity Generation from Artificial Wastewater Using an Upflow Microbial Fuel Cell." Environmental Science and Technology 2005, vol. 39, pp. 5262-5267.

Zuo, Y., S. Cheng, D. Call, and B.E. Logan. "Tubular Membrane Cathodes for Scalable Power Generation in Microbial Fuel Cells." Environmental Science and Technology, pp. A-G.

Yu, E.H., Cheng, S., Scott, K., Logan, B.E., Microbial fuel performance with non-Pt cathode catalysts, J. Power Sources, 171(2):275-281 (2007).

Cheng, S., Logan, B.E., Sustainable and efficient biohydrogen production via electrohydrogenesis, PNAS, 104(47):18871-18873 (2007).

Call, D., Logan, B.E., Hydrogen production in a single chamber microbial electrolysis cell lacking a membrane, Environ. Sci. Technol., 42(9):3401-3406 (2008).

Xing, D., Zuo, Y., Cheng, S., Regan, J.M., Logan, B.E., Electricity generation by *Rhodopseudomonas palustris*, DX-1, Environ. Sci. Technol., 42: 4146-4151, 2008.

Chen, Weifang, Cannon, Fred S., Rangel-Mendez, Jose R., Ammonia-Tailoring of GAC to enhance perchlorate removal. I: Characterization of $NH_3$ thermally tailored GACs, Carbon 43 (2005) 573-580.

Chen, Weifang, Cannon, Fred S., Rangel-Mendez, Jose R., Ammonia-tailoring of GAC to enhance perchlorate removal. II: Perchlorate adsorption, Carbon 43 (2005) 581-590.

Min, B., "Perchlorate remediation using packed-bed bioreactors and electricity generation in microbial fuel cells (MFCs)," Thesis submitted to The Pennsylvania State University, The Graduate School, Department of Civil and Environmental Engineering, May 2005.

Benemann, J. et al., Novel Photobiological Hydrogen Production Process, *Proceedings of the 13th International Congress on Photosynthesis* (Montreal, Canada) 2004 Eds, Van der Est and Bruce, p. 878-880.

Rezaei, F., Substrate-Enhanced Microbial Fuel Cells for Improved Remote Power Generation from Sediment-Based Systems, *Environmental Science & Technology*, 41(11): 4053-58, 2007.

Ditzig, J., Production of hydrogen from domestic wastewater using a bioelectrically assisted microbial reactor (BEAMR), *International Journal of Hydrogen Energy*, 32: 2296-2304, 2007.

Ringeisen, B., A miniature microbial fuel cell operating with an aerobic anode chamber, *Journal of Power Sources*, 165: 591-597, 2007.

Ren, Z., Characterization of the cellulolytic and hydrogen-producing activities of six mesophilic *Clostridium* species, *Journal of Applied Microbiology*, 103: 2258-2266, 2007.

Biffinger, J., Engineering Microbial Fuels Cells: Recent Patents and New Directions, *Recent Patents on Biotechnology*, 2: 150-155, 2008.

Cord-Ruwisch, R., Growth of *Geobacter sulfurreducens* with Acetate in Syntrophic Cooperation with Hydrogen-Oxidizing Anaerobic Partners, *Applied and Environmental Microbiology*, 64(6): 2232-2236, Jun. 1998.

Ren, Z., Electricity Production from Cellulose in a Microbial Fuel Cell Using a Defined Binary Culture, *Environmental Science & Technology*, 41(13): 4781-4786, 2007.

Logan, B.E., Transport of Chemicals Present as Pure Phases, p. 399-405 in Environmental Transport Processes, John Wiley & Sons. 1999.

Dumas, C., et al., Marine microbial fuel cell: Use of stainless steel electrodes as anode and cathode materials, *Electrochimica Acta*, 53: 468-473, 2007.

Bergel, A., Catalysis of oxygen reduction in PEM fuel cell by seawater biofilm, *Electrochemistry Communications*, 7: 900-904, 2005.

Zuo, Y. et al., Ion Exchange Membrane Cathodes for Scalable Microbial Fuel Cells, *Environmental Science & Technology*, 42(18): 6967-6972, 2008.

Zuo, Y. et al., Tubular Membrane Cathodes for Scalable Power Generation in Microbial Fuel Cells, *Environmental Science and Technology*, 41:3347-3353, 2007.

Biniak, et al., Modified porous carbon materials as catalytic support for cathodic reduction of dioxygen, Fuel Processing Technology 79: 251-257, 2002.

Call, et al., High surface area stainless steel brushes as cathodes in microbial electrolysis cells, *Environmental Science Technology*, 43: 2179-2183, 2009.

Olivares-Ramirez, et al., Studies on the hydrogen evolution reaction on different stainless steels, International Journal of Hydrogen Energy, 32: 3170-3173, 2007.

Selembo, et al., The use of stainless steel and nickel alloys as low-cost cathodes in microbial electrolysis cells, Journal of Power Sources, 190: 271-278, 2009.

Selembo, et al., Hydrogen production with nickel powder cathode catalysts in microbial electrolysis cells, *International Journal of Hydrogen Energy*, 35: 428-437, 2010.

Stohr et al., Enhancement of the catalytic activity of activated carbons in oxidation reactions by treatment with ammonia or hydrogen cyanide and observation of a superoxide species as a possible intermediate, *Carbon*, 29(6): 707-720, 1991.

Zhang, et al., Microbial fuel cell cathods with poly(dimethylsiloxane) diffusion layers constructed around stainless steel mesh current collectors, *Environmental Science and Technology*, 44:1490-1495, 2010.

Zhang, et al. Power generation using an activated carbon and metal cathode in a microbial fuel cell, *Electrochemistry Communications*, 11:2177-2179, 2009.

* cited by examiner

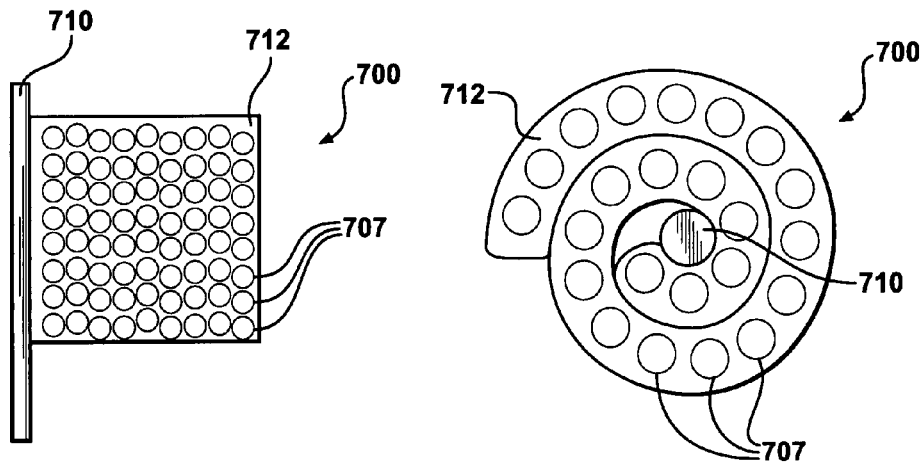
FIG - 7A  FIG - 7B
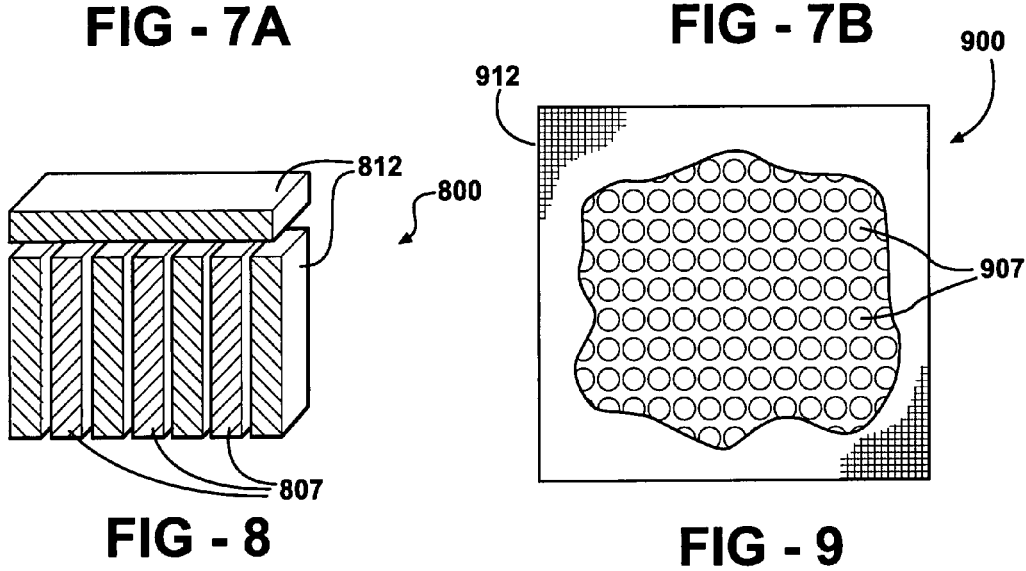
FIG - 8  FIG - 9
FIG - 10
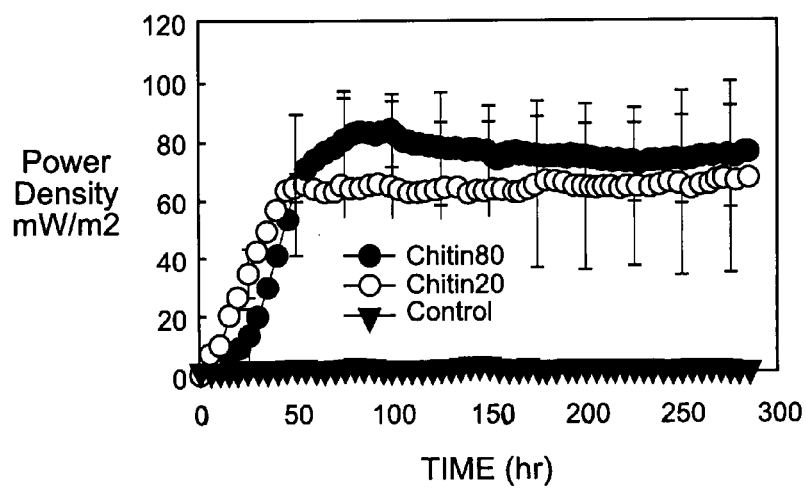

SUBSTRATE-ENHANCED MICROBIAL FUEL CELLS

REFERENCE TO RELATED APPLICATIONS

This application claims priority of U.S. Provisional Patent Application 60/796,761, filed May 2, 2006, the entire content of which is incorporated herein by reference.

GOVERNMENT SPONSORSHIP

Research carried out in connection with this invention was supported in part by National Science Foundation grant BES-0401885 and United States Department of Agriculture grant 68-3A75-3-150. Accordingly, the United States government may have certain rights in the invention.

FIELD OF THE INVENTION

The present invention relates generally to microbial fuel cells. Specific embodiments relate to microbial fuel cells including a solid material metabolizable by bacteria.

BACKGROUND OF THE INVENTION

Recent research advances have led to the development of fuel cell devices which utilize bacteria as catalysts to create useful products, such as electricity and hydrogen. The bacteria oxidize a substrate, electrons produced are transferred to an anode and flow to a cathode through a conductive connection which may be further connected to a load, such as a device powered by electricity produced by the fuel cell.

While development of these devices holds great promise for progress towards new energy technologies, certain applications are limited by an inability to provide a bacterial oxidation substrate in required amounts in order to keep the fuel cell operating at a desired level.

For example, sediment microbial fuel cells are desirably operated remotely but are hampered by relatively low power output. A sediment microbial fuel cell generally includes an anode embedded in an anaerobic marine sediment, and a cathode suspended in the overlying oxygenated seawater. The electrons released by the bacterial degradation of the organic matter in the sediment flow from the anode to the cathode through an external circuit, while protons diffuse through the water between the electrodes. The electrons and protons then react at the cathode with oxygen, forming water. However, sediments are generally relatively poor in organic matter content, ranging from about 2-6%, such that power output is limited.

Thus, there is a continuing need for substrate formulations for microbial fuel cells and microbial fuel cell configurations for use with substrate formulations.

SUMMARY OF THE INVENTION

A microbial fuel cell configuration is provided including a substrate formulation for a microbial fuel cell. In a particular embodiment, a substrate formulation is included in a microbial fuel cell in a package porous to bacteria. In a further particular embodiment, a substrate formulation for bacterial metabolism includes a solid biodegradable organic material in a package porous to bacteria.

Also provided are embodiments in which at least a portion of the package containing the substrate formulation is electrically conductive and forms at least a portion of an anode. For example, the package is optionally made of an electrically conductive material including carbon paper, carbon cloth, carbon felt, carbon wool, carbon foam, graphite, porous graphite, graphite powder, graphite granules, graphite fiber, a conductive polymer, and a conductive metal. A combination of any of these may also be used to form the package.

A microbial fuel cell is provided according to embodiments of the present invention which includes an anode, a cathode, an electrically conductive connector connecting the anode and the cathode, and a housing for containing an aqueous medium, the aqueous medium in contact with at least a portion of the anode wherein a solid formulation of a biodegradable organic material is disposed in the aqueous medium. The solid form substrate is formulated to support electron generation and transfer to the anode by anodophilic bacteria over a selected minimum period of time. In particular embodiments, the solid form of the substrate is substantially insoluble in an aqueous medium.

The solid biodegradable organic substrate is optionally in the form of one or more particles. In such an embodiment, each of the one or more particles has a particle surface area and the total surface area of the solid form of the substrate is the sum of the particle surface area of the one or more particles.

Further provided is an electrode for a microbial fuel cell according to the present invention which includes an electrically conductive wall configured to form a container for a solid substrate for bacterial metabolism. The container wall is preferably substantially non-toxic to anodophilic bacteria. Additionally, at least a portion of the container wall is porous to bacteria. A solid substrate for bacterial metabolism is disposed in the container. The solid substrate is preferably an organic material oxidizable by anodophilic bacteria and/or metabolizable by anodophilic bacteria or other bacteria to produce a substrate oxidizable by anodophilic bacteria.

In particular embodiments the electrically conductive wall includes carbon cloth. The electrically conductive wall optionally includes carbon paper, carbon cloth, carbon felt, carbon wool, carbon foam, graphite, porous graphite, graphite powder, graphite granules, graphite fiber, a conductive polymer, a conductive metal, or a combination of any of these.

A method of producing electricity and/or hydrogen gas is provided according to the present invention including providing a biodegradable substrate formulation for a microbial fuel cell. In a particular embodiment, a biodegradable substrate formulation is included in a microbial fuel cell in a package porous to bacteria. In a further particular embodiment, a s biodegradable substrate formulation includes a solid biodegradable organic material in a package porous to bacteria.

In particular embodiments, methods of producing electricity and/or hydrogen gas are provided according to the present invention which include providing a solid form of a biodegradable substrate formulated to support electron generation and transfer to the anode by anodophilic bacteria over a selected minimum period of time.

BRIEF DESCRIPTION OF THE DRAWINGS

FIG. 7A is an image illustrating a particular embodiment of an electrode configured to contain a solid substrate for bacterial metabolism;

FIG. 7B is an image illustrating a top view of a particular embodiment of an electrode configured to contain a solid substrate for bacterial metabolism;

FIG. 8 is an image illustrating a partial breakaway view a particular embodiment of an electrode configured to contain a solid substrate for bacterial metabolism;

FIG. 9 is an image illustrating a particular embodiment of an electrode configured to contain a solid substrate for bacterial metabolism;

FIG. 10 is a graph showing power generation from a "substrate-enhanced" sediment microbial fuel cell according to an embodiment of the present invention with Chitin 20 and Chitin 80 as solid substrate as well as a control sediment microbial fuel cell without solid substrate;

DETAILED DESCRIPTION OF THE PREFERRED EMBODIMENTS

Figure 1:
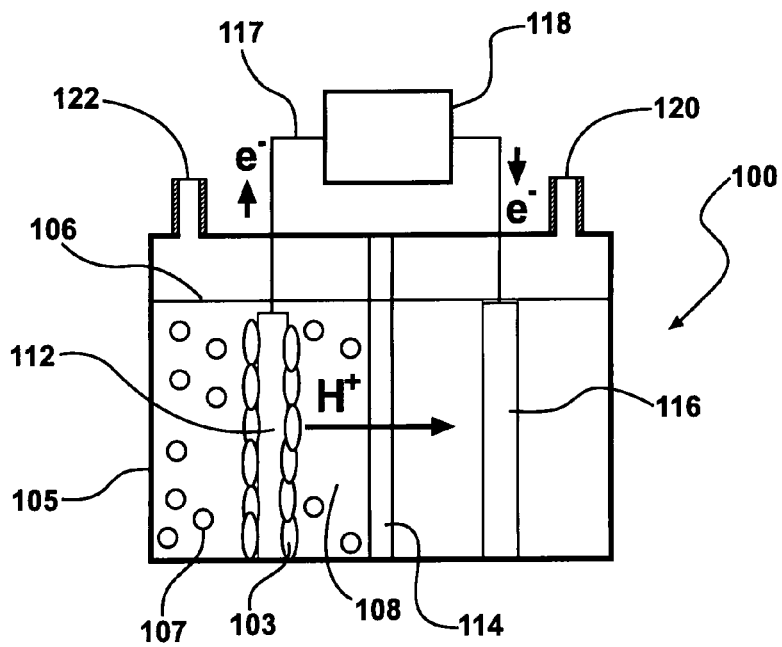
FIG. 1 is an image illustrating an embodiment of a microbial fuel cell, showing two chambers separated by a cation exchange membrane and a solid substrate disposed in the anode chamber.

Microbial fuel cells are provided according to the present invention which include solid biodegradable organic matter. A microbial fuel cell is useful in various applications, such as in wastewater treatment, or in renewable energy production, for example. A microbial fuel cell according to the present invention may be used to power a device, such as a portable electronic device. A microbial fuel cell according to the present invention is advantageously used in a remote device, such as a marine sensor or power supply station for sensors.

Broadly described, a microbial fuel cell includes bacteria as a catalyst for generation of electrons for production of electricity and/or hydrogen. A microbial fuel cell generally includes an anode, a cathode and an electron conductor connecting the anode and cathode. Bacteria capable of oxidizing a substrate to produce electrons are included in a microbial fuel cell. A cation exchange membrane is optionally included in particular configurations of a microbial fuel cell.

Broadly describing operation of a microbial fuel cell configured to produce electricity, a provided oxidizable substrate is oxidized by bacteria which generate electrons, protons and carbon dioxide. The electrons are transferred to the anode, and, through a load such as a device to be powered, to the cathode. Protons and electrons react with oxygen at the cathode, producing water.

Broadly describing operation of a microbial fuel cell configured to produce hydrogen, a provided oxidizable substrate is oxidized by bacteria which generate electrons, protons and carbon dioxide. A power source is connected to the microbial fuel cell and a voltage is applied. The electrons generated by the bacteria are transferred to the anode, and, through a conductive connector, to the cathode. Protons and electrons combine at the cathode, producing hydrogen.

Bacteria in a microbial fuel cell include at least one or more species of anodophilic bacteria. The terms "anodophiles" and "anodophilic bacteria" as used herein refer to bacteria that transfer electrons to an electrode, either directly or by endogenously produced mediators. In general, anodophiles are obligate or facultative anaerobes. The term "exoelectrogens" is also used to describe suitable bacteria. Examples of anodophilic bacteria include bacteria selected from the families Aeromonadaceae, Alteromonadaceae, Clostridiaceae, Comamonadaceae, Desulfuromonaceae, Enterobacteriaceae, Geobacteraceae, Pasturellaceae, and Pseudomonadaceae. These and other examples of bacteria suitable for use in an inventive system are described in Bond, D. R., et al., Science 295, 483-485, 2002; Bond, D. R. et al., Appl. Environ. Microbiol. 69, 1548-1555, 2003; Rabaey, K., et al., Biotechnol. Lett. 25, 1531-1535, 2003; U.S. Pat. No. 5,976,719; Kim, H. J., et al., Enzyme Microbiol. Tech. 30, 145-152, 2002; Park, H. S., et al., Anaerobe 7, 297-306, 2001; Chauduri, S. K., et al., Nat. Biotechnol., 21:1229-1232, 2003; Park, D. H. et al., Appl. Microbiol. Biotechnol., 59:58-61, 2002; Kim, N. et al., Biotechnol. Bioeng., 70:109-114, 2000; Park, D. H. et al., Appl. Environ. Microbiol., 66, 1292-1297, 2000; and Pham, C. A. et al., Enzyme Microb. Technol., 30: 145-152, 2003; and Logan, B. E., et al., Trends Microbiol., 14(12):512-518.

Anodophilic bacteria preferably are in contact with an anode for direct transfer of electrons to the anode. However, in the case of anodophilic bacteria which transfer electrons through a mediator, the bacteria may be present elsewhere in the reactor and still function to produce electrons useful in an inventive process.

Optionally, a mediator of electron transfer is included in a fuel cell. Such mediators are exemplified by ferric oxides, neutral red, anthraquinone-1,6-disulfonic acid (ADQS) and 1,4-napthoquinone (NQ). Mediators are optionally chemically bound to the anode, or the anode modified by various treatments, such as coating, to contain one or more mediators.

Anodophilic bacteria may be provided as a purified culture, enriched in anodophilic bacteria, or even enriched in a specified species of bacteria, if desired. Pure culture tests have reported Coulombic efficiencies as high as 98.6% in Bond, D. R. et al., Appl. Environ. Microbiol. 69, 1548-1555, 2003. Thus, the use of selected strains may increase overall electron recovery and hydrogen production, especially where such systems can be used under sterile conditions. Bacteria can be selected or genetically engineered that can increase Coulombic efficiencies and potentials generated at the anode.

Further, a mixed population of bacteria may be provided, including anodophilic anaerobes and other bacteria.

A biodegradable substrate included in a microbial fuel cell according to embodiments of the present invention is oxidizable by anodophilic bacteria or biodegradable to produce a material oxidizable by anodophilic bacteria.

A biodegradable substrate is an organic material biodegradable to produce an organic material oxidizable by anodophilic bacteria in preferred embodiments. Organic materials oxidizable by anodophilic bacteria are known in the art. Illustrative examples of an organic material oxidizable by anodophilic bacteria include, but are not limited to, monosaccharides, disaccharides, amino acids, straight chain or branched $C_1$-$C_7$ compounds including, but not limited to, alcohols and volatile fatty acids. In addition, organic materials oxidizable by anodophilic bacteria include aromatic compounds such as toluene, phenol, cresol, benzoic acid, benzyl alcohol and benzaldehyde. Further organic materials oxidizable by anodophilic bacteria are described in Lovely, D. R. et al., Applied and Environmental Microbiology 56:1858-1864, 1990.

Specific examples of organic materials oxidizable by anodophilic bacteria include glycerol, glucose, acetate, butyrate, ethanol, cysteine and combinations of any of these or other oxidizable organic substances.

The term "biodegradable" as used herein refers to an organic substance decomposed by biological mechanisms illustratively including microbial action, heat and dissolution. Microbial action includes hydrolysis, for example.

A biodegradable organic substrate included in a microbial fuel cell according to the present invention are preferably naturally occurring and/or synthetic polymers illustratively including polysaccharides, plastics, fats and proteins in particular embodiments.

The term "polysaccharide" as used herein refers to a naturally occurring or synthetic, linear or branched, polymer of monosaccharide monomeric units. The term includes polymers where the monosaccharide monomeric units are individually naturally occurring or synthetic. Linkages between monosaccharide units may be alpha-1,2; alpha-1,3; alpha-1, 4; alpha-1,6; beta-1,2; beta-1,3; beta-1,4; beta-1,6, for example. Examples of polysaccharides include dextran, xylan, mannan, inulin, levan, arabin, gluten, alginic acid, mannoglucan, chitosan, starch, pectin and pullulan. Polysaccharides included in particular embodiments are chitin and cellulose. Combinations of two or more polysaccharides are optionally included.

In particular embodiment, a biodegradable substrate is a solid polysaccharide.

Included polysaccharides are chitin and/or cellulose in specific embodiments of a microbial fuel cell according to the present invention.

An included solid polysaccharide is optionally a naturally occurring polysaccharide and/or a synthetic polysaccharide. In particular embodiments, an included solid polysaccharide is substantially insoluble in an aqueous medium.

A biodegradable plastic is included in embodiments of a microbial fuel cell according to the present invention as a biodegradable substrate. The term "plastic" as used herein refers to a naturally occurring or synthetic organic polymer which is not a polysaccharide, protein or nucleic acid. Examples of biodegradable plastics include biodegradable aliphatic polyesters, biodegradable aliphatic-aromatic polyesters, biodegradable polyurethanes and biodegradable polyvinyl alcohols. Specific examples of biodegradable plastics include polyhydroxyalkanoates, polyhydroxybutyrate, polyhydroxyhexanoate, polyhydroxyvalerate, polyglycolic acid, polylactic acid, polycaprolactone, polybutylene succinate, polybutylene succinate adipate, polyethylene succinate, aliphatic-aromatic copolyesters, polyethylene terephthalate, polybutylene adipate/terephthalate and polymethylene adipate/terephthalate.

In particular embodiments, a biodegradable plastic is substantially insoluble in an aqueous medium.

Biodegradable polymers may be obtained commercially, by isolation from natural sources, or by synthesis according to standard methods known in the art, for example, as exemplified in Griffin, G., Ed., Chemistry and Technology of Biodegradable Polymers, Springer, 1993; and Chiellini, E. and Solaro, R., Eds., Biodegradable Polymers and Plastics, Springer, 2006.

In particular embodiments, a biodegradable polymer is formulated to support electron generation and transfer to the anode by anodophilic bacteria over a selected minimum period of time. In particular, a biodegradable polymer is formulated such that biodegradation occurs over a selected period of time, allowing controlled delivery of an oxidizable organic substrate to anodophilic bacteria. Factors affecting biodegradation include the state of the biodegradable polymer, such as liquid, solid or gel; the size and shape of a solid biodegradable polymer; solubility of a solid biodegradable polymer; molecular weight of a biodegradable polymer; and degree of cross-linking of a biodegradable polymer.

A biodegradable polymer substrate is formulated to have a specified size and/or shape in particular embodiments. Processing techniques for achieving a particular size and/or shape are known in the art and illustratively include molding, compression, extrusion, ball milling, comminution, spheronization, pelletization, granulation, precipitation, co-precipitation, coacervation, gelation, eutectic mixing, drying, spray drying, encapsulation and combinations of any of these or other material processing methods.

Shape of a biodegradable substrate illustratively includes, but is not limited to, a shape which is generally a sphere, disc, needle, cone, cube, rectangular solid also called slab, pyramid, trapezoid, and cylinder.

In particular embodiments, a biodegradable organic substrate includes at least one solid biodegradable polymer composition.

A formulation of a biodegradable organic substrate optionally includes more than one biodegradable polymer.

A biodegradable organic substrate may be formulated for relatively slow biodegradation to yield an organic material oxidizable by anodophilic bacteria. In general, larger biodegradable organic substrate structures are biodegraded more slowly than smaller structures. Similarly, insoluble or slightly soluble substrates are biodegraded more slowly than soluble materials.

In particular embodiments, a multi-stage substrate formulation is included. A multi-stage formulation is characterized by two or more phases of release of a substrate from a substrate formulation. For example, a mixture of a soluble biodegradable material and an insoluble biodegradable material is included in a multi-stage substrate formulation.

In further embodiments, an organic material oxidizable by anodophilic bacteria is supplied along with a more slowly biodegradable material such that a first phase of release provides anodophilic bacteria with an immediately available substrate oxidizable by the anodophilic bacteria and a second phase of release follows biodegradation of a portion of the more slowly biodegraded substrate, yielding a substrate oxidizable by the anodophilic bacteria.

Determination of the rate of biodegradation of a particular formulation of a biodegradable substrate is performed in any of various ways.

In particular, the slow dissolution rate can be modeled and engineered for predictable degradation rates in a fuel cell according to the present invention. For example, assuming a spherical particle, the dissolution rate of the particle is modeled based on time to dissolve the particle mass (m), and a mass transfer coefficient for the system, K (Logan, B. E. 1999. *Environmental Transport Processes*. John Wiley & Sons, New York.), the rate of dissolution, W, is calculated as $$W = KA(c_s - c_\infty) \tag{1}$$

where A is the surface area of the particle, $c_s$ the surface concentration, and $c_\infty$ the bulk phase concentration. Here, an assumption is made that the bulk phase concentration is effectively zero due to biodegradation. The dissolution rate can also be expressed as a function of the mass of the particle, as $$W = -\frac{dm}{dt} \tag{2}$$

As the particle dissolves its surface area will change over time. Combining the above two equations, and showing the dependence of the area of the mass of the particle, yields $$\frac{dm}{dt} = -Kc_s A(m) \tag{3}$$

The lifetime of the particle can therefore be calculated by integrating the above equation, for an initial mass of $m_0$ over time $t_c$ for complete dissolution, producing $$\int_{m_0}^{0} dm = -Kc_s \int_{0}^{t_c} dt \tag{4}$$

Evaluating the integral on the right-hand side, the time for complete dissolution, $t_c$, is obtained as a function of the area as:

$$t_c = -\frac{1}{Kc_s} \int_{0}^{t_c} \frac{dm}{A(m)} \tag{5}$$

In order to use the above model, the specific geometry of the dissolving particle is input before integration. For a spherical particle, the mass of the particle is related to its radius, R, according to $$m = \rho_c \frac{4\pi R^3}{3} \tag{6}$$

where $\rho_c$ is the density of the dissolving chemical. The total surface area of a sphere is a function of the radius, or $A = 4\pi R^2$, so the surface area of the particle at any time is:

$$A(m) = 4\pi \left(\frac{3m}{4\pi \rho_c}\right)^{2/3} \tag{7}$$

Putting eq. 7 into eq. 5, a model is obtained for the time for complete dissolution of the spherical particle substrate, $t_s$, of:

$$t_s = \frac{3 m_0^{1/3}}{4\pi Kc_s} \left(\frac{4\pi \rho_c}{3}\right)^{2/3} \tag{8}$$

As a specific example, for a 0.32 cm particle of density 1.4 g/cm³, a solution surface concentration of 10 mg/L, and stagnant fluid conditions so that the Sherwood number, Sh, can be related to the mass transfer coefficient as Sh=KR/D (Logan, B. E. 1999. *Environmental Transport Processes*. John Wiley & Sons, New York), where the chemical diffusivity is approximated as D=$10^{-5}$ cm²/s, a chemical lifetime of $t_s$=46 yr is calculated. Changing the size of the particle will affect the lifetime and dissolution rates of the particles. In addition, assumptions about the effective concentration and mass transfer coefficient may be tested based on measurements collected during laboratory tests.

In a further example, the substrate has a plate, or brick, morphology, the brick-shaped substrate located between adjacent electrodes in a particular example. Thus, planar geometry is used to calculate surface area and the lifetime of the fuel cell where the brick-shaped substrate is the sole source of biodegradable substrate to support electron generation and transfer to the anode by anodophilic bacteria over a selected minimum period of time. For this case, the area-mass relationship is calculated, assuming both sides of the plate are dissolving, as:

$$A(m) = \frac{m_p}{\rho_c h_p} \tag{9}$$

Inserting into eq. 5 above, and integrating over a time until a small fraction of the mass remains, defined as $f_p$, we have $$t_p = -\frac{\rho_c h_p \ln f_p}{Kc_s} \tag{10}$$

Repeating the above example for a plate of thickness $h_p$=20 cm, assuming effectively complete dissolution when 1% of the mass remains, and using a mass transport coefficient for a slowly moving river based on the correlation of Novotny (Table 11.6 in Logan, B. E. 1999. *Environmental Transport Processes*. John Wiley & Sons, New York) with a roughness coefficient of 5 cm and a shear velocity of 0.01 cm/s so that K=4.5 cm/s, yields an estimated lifetime of $t_p$=3.3 yr. In a sediment microbial fuel cell, this calculation pertains to a brick-shaped substrate sitting on top of the sediment. Where electrodes and substrate are immersed in the sediment, the shear velocity on the substrate would be quite small, increasing the lifetime to a decade or more.

Fuel cells including a biodegradable substrate are provided according to the present invention.

In a particular embodiment, a provided microbial fuel cell includes an anode, a cathode, an electrically conductive connector connecting the anode and the cathode, a housing for containing an aqueous medium and a solid form of a biodegradable substrate disposed in the aqueous medium. The solid form of the substrate has a total surface area selected to support electron generation and transfer to the anode by anodophilic bacteria over a selected minimum period of time.

The minimum period of time is in the range of about 1 hour to about 100 years, but may be longer or shorter, depending on the intended application.

It is appreciated that once a provided substrate formulation is completely exhausted, a fuel cell may still be operable in some configurations. For example, a sediment fuel cell is operable even after depletion of an included substrate formulation since oxidizable organic matter is present in sediment.

A solid biodegradable substrate may be disposed in a microbial fuel cell in a variety of positions relative to the anode and other components.

For example, solid biodegradable substrate may be included in an aqueous medium, the aqueous medium in contact with the anode. Thus, for example, a solid biodegradable substrate is disposed in the anode chamber of a two chamber microbial fuel cell housing in one embodiment. In a further embodiment, a solid biodegradable substrate is disposed in a single chamber microbial fuel cell housing which includes an anode.

In further embodiments, a microbial fuel cell configuration is provided including a solid form of a substrate for bacterial metabolism in a package porous to bacteria. The package serves to retain the substrate and, in particular configurations, to position the substrate in proximity to anodophilic bacteria on the anode.

The package retains the substrate in contact with the package and allows bacteria access to the substrate. Optionally, the package has a wall at least partially made of a porous material, the wall configured to enclose the substrate in the package such that bacteria access the substrate through the pores in the porous material. In a further option, the wall is made of a non-porous material and the wall is configured to have an opening such that the substrate is only partially enclosed in the package.

In particular embodiments of a microbial fuel cell according to the present invention, at least a portion of the package containing the substrate is electron conductive and forms at least a portion of an anode. For example, the package is optionally made at least partially of an electrically conductive material illustratively including carbon paper, carbon cloth, carbon felt, carbon wool, carbon foam, graphite, porous graphite, graphite powder, graphite granules, graphite fiber, a conductive polymer, a conductive metal. A combination of any of these may also be used to form the package.

A sediment fuel cell is provided according to embodiments of the present invention. A sediment fuel cell according to embodiments of the present invention includes an anode for immersion in bacteria-containing sediment, a cathode, an electrically conductive connector connecting the anode and the cathode, and a solid form of a substrate for bacterial metabolism disposed in a package. In particular embodiments of a sediment microbial fuel cell according to the present invention, at least a portion of the package containing the substrate is electron conductive and forms at least a portion of an anode.

A microbial fuel cell according to the present invention may be configured to produce electricity and/or hydrogen in particular embodiments.

An embodiment of an inventive system is a completely anaerobic system to generate hydrogen at the cathode by providing a small added voltage to the circuit. This approach to electrochemically assist hydrogen production is based on separating the two electrodes into half cell reactions. The potential of the anode is set by the oxidation of a substrate. Thus, the anode side of an embodiment of an inventive system operates similarly to that in a microbial fuel cell (MFC): bacteria oxidize an organic compound completely to $CO_2$ and transfer electrons to the anode. The half reaction potential measured at the anode in an embodiment of an inventive system tests as −480 mV (Ag/AgCl) or −285 mV (NHE) (reduction).

In contrast, cathode operation in an embodiment of an inventive anaerobic hydrogen generation system is significantly altered from that in a standard MFC. By electrochemically augmenting the cathode potential in a MFC circuit it is possible to directly produce hydrogen from protons' and electrons produced by the bacteria. This approach greatly reduces the energy needed to make hydrogen directly from organic matter compared to that required for hydrogen production from water via electrolysis. In a typical MFC, the open circuit potential of the anode is ~−300 mV. Where hydrogen is produced at the cathode, the half reactions occurring at the anode and cathode, with acetate oxidized at the anode, are:

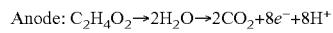
Anode: $C_2H_4O_2 \rightarrow 2H_2O \rightarrow 2CO_2 + 8e^- + 8H^+$

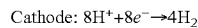
Cathode: $8H^+ + 8e^- \rightarrow 4H_2$

A power source for enhancing an electrical potential between the anode and cathode is included. Power sources used for enhancing an electrical potential between the anode and cathode are not limited and illustratively include grid current, solar power sources, wind power sources. Further examples of a power source suitable for use in an inventive system illustratively include a DC power source and an electrochemical cell such as a battery or capacitor.

In a particular embodiment, a power supply for a hydrogen producing microbial fuel cell is an electricity producing microbial fuel cell.

Electrodes included in a microbial fuel cell according to the present invention are electrically conductive. Exemplary conductive electrode materials include, but are not limited to, carbon paper, carbon cloth, carbon felt, carbon wool, carbon foam, graphite, porous graphite, graphite powder, a conductive polymer, a conductive metal, and combinations of any of these.

Typically, an anode provides a surface for attachment and growth of anodophilic bacteria and therefore an anode is made of material compatible with bacterial growth and maintenance. Compatibility of a material with bacterial growth and maintenance in a microbial fuel cell may be assessed using standard techniques such as assay with a viability marker such as Rhodamine 123, propidium iodide, SYTO 9 and combinations of these or other bacteria viability markers.

An anode according to the present invention is in contact with a biodegradable substrate in particular embodiments. For example, an anode according to the present invention retains a solid and/or semi-solid biodegradable substrate in a desired location in particular embodiments. Optionally, an anode material is configured to form a container for a solid and/or semi-solid biodegradable substrate.

A cathode included in an inventive system may be configured to be immersed in liquid or as a gas cathode, having a surface exposed to a gas. A cathode is electrically conductive and thus includes an electrically conductive material. Electrically conductive materials included in a cathode included in an inventive system illustratively include carbon cloth, carbon paper, carbon wool, carbon foam, a conductive but corrosion resistant metal such as titanium, a conductive polymer and combinations thereof. Preferably, a cathode included in an inventive system includes a catalyst metal, such as a noble. Suitable catalyst metals illustratively include platinum, nickel, copper, tin, iron, palladium, cobalt, tungsten, and alloys of such metals. While a catalyst metal such as platinum is included in a cathode in one embodiment of an inventive system, the platinum content may be reduced, for example to as little as 0.1 mg/cm$^2$ without affecting energy production.

Optionally, and preferably in some embodiments, the cathode is a gas cathode.

In particular embodiments, the cathode contains one or more cathode shielding materials. Such a shielding material may preferably include a layer of a shielding material disposed on any cathode surface, including an inner cathode surface, that is, a cathode surface present in the interior volume of the reaction chamber, and an outer surface, that is, a cathode surface exterior to the reaction chamber. A cathode surface exterior to the reaction chamber is likely to be present where a gas cathode is used, where the exterior cathode surface is in contact with a gas. Thus, in one embodiment an outer surface of a cathode is covered partially or preferably wholly by a cathode diffusion layer (CDL). The CDL may be directly exposed to the gas phase and is preferably bonded to the cathode to prevent water leakage through the cathode from the interior of the reaction chamber. Further, the CDL is hydrogen permeable, allowing hydrogen to freely diffuse from the catalyst in the cathode into a gas collection chamber, gas conduit or other component of a gas collection system. A CDL may further provide support for the cathode and may further form a portion of a wall of a reaction chamber. A CDL can also help to reduce bacteria from reaching the cathode and fouling the surface. A CDL includes a hydrogen permeable hydrophobic polymer material such as polytetrafluoroethylene (PTFE) or like materials. The thickness of this material can be varied or multiple layers can be applied depending on the need to reduce water leakage.

In a further embodiment, an inner cathode surface is protected by a cathode protection layer (CPL). The function of the CPL is to protect the cathode from biofouling of the catalyst. Further, a CPL reduces diffusion of carbon dioxide to the cathode so as to limit methane formation from both abiotic and biotic sources, or from the action of bacteria, at the cathode. Bacteria can attach to the CPL, and through such attachment, form a biofilm that can help to remove any oxygen that could diffuse towards the anode. A CPL can be designed to enhance bacterial attachment for this purpose of removing dissolved oxygen. The CPL can be made of an electrically non-conductive material, thus allowing the anode and cathode to be placed very near each other, but not allowing them to touch each other. Reducing electrode spacing generally increases current densities and thus in particular embodiments electrode spacing is minimized.

In one embodiment, a CPL is configured such that it is in contact with an inner surface of a cathode. Thus, for instance, a CPL may be configured to cover the inner surface of the cathode partially or wholly, such as by bonding of the CPL to the cathode.

In a further embodiment, a CPL is present in the interior of the reaction chamber but not in contact with the cathode. The inclusion of such a CPL defines two or more regions of such a reactor based on the presence of the CPL. The CPL can be proton, liquid, and/or gas permeable barriers, such as a filter. For example, a filter for inhibiting introduction of large particulate matter into the reactor may be positioned between the anode and cathode such that material flowing through the reaction chamber between the anode and cathode passes through the filter. Alternatively or in addition, a filter may be placed onto the cathode, restricting the passage of bacteria-sized particles to the cathode and the catalyst. Further, a filter may be positioned between an inlet channel and/or outlet channel and the interior of the reaction chamber or a portion thereof. Suitable filters may be configured to exclude particles larger than 0.01 micron-1 micron for example. A CPL may also include material that aids bacterial attachment, so that bacteria can scavenge dissolved oxygen that can leak into the system.

In one embodiment, a CPL includes a "proton diffusion layer" for selectively allowing passage of material to the vicinity of a cathode. In one embodiment, a diffusion layer includes an ion exchange material. Any suitable ion conducting material which conducts protons may be included in a proton exchange membrane. For example, a perfluorinated sulfonic acid polymer membrane may be used. In particular, a proton exchange membrane such as NAFION, that conducts protons, may be used for this purpose.

In one embodiment, a diffusion layer includes an anion exchange material. In a preferred embodiment the diffusion layer includes an anion exchange material that conducts anions, associated with protons produced by anodophilic bacteria, to the cathode, such as a quaternary amine styrene divinylbenzene copolymer. An included diffusion layer further functions to inhibit diffusion of gas to or from the cathode relative to the anode chamber. Without wishing to be bound by theory it is believed that the protons associated with the negatively charged, anionic, ion exchange groups, such as phosphate groups, specifically allow passage of negatively charged anions that contain positively charged protons but overall carry a net negative charge, and not allowing passage of positively charged ions and reducing the diffusion of hydrogen into the anode chamber. Such a diffusion layer allows for efficient conduction of protons across the barrier while inhibiting backpassage passage of hydrogen. An example of such a diffusion layer material is the anion exchange membrane AMI-7001, commercially supplied by Membranes International, Glen Rock, N.J. In addition to membrane form, the diffusion layer can also include an anion conducting material applied as a paste directly to the cathode. In a preferred embodiment, an anion exchange material can be used to contain the catalyst applied to the cathode.

An anode and cathode may have any of various shapes and dimensions and are positioned in various ways in relation to each other. In one embodiment, the anode and the cathode each have a longest dimension, and the anode and the cathode are positioned such that the longest dimension of the anode is parallel to the longest dimension of the cathode. In another option, the anode and the cathode each have a longest dimension, and the anode and the cathode are positioned such that the longest dimension of the anode is perpendicular to the longest dimension of the cathode. Further optionally, the anode and the cathode each have a longest dimension, and the anode and the cathode are positioned such that the longest dimension of the anode is perpendicular to the longest dimension of the cathode. In addition, the anode and the cathode may be positioned such that the longest dimension of the anode is at an angle in the range between 0 and 180 degrees with respect to the longest dimension of the cathode.

Electrodes of various sizes and shapes may be included in an inventive system. In general, an anode has a surface having a surface area present in the reaction chamber and the cathode has a surface having a surface area in the reaction chamber. In one embodiment, a ratio of the total surface area of anodes to surface area of cathodes in an inventive system is about 1:1. In one embodiment, the anode surface area in the reaction chamber is greater than the cathode surface area in the reaction chamber. This arrangement has numerous advantages such as lower cost where a cathode material is expensive, such as where a platinum catalyst is included. In addition, a larger anode surface is typically advantageous to provide a growth surface for anodophiles to transfer electrons to the anode. In a further preferred option a ratio of the anode surface area in the reaction chamber to the cathode surface area in the reaction chamber is in the range of 1.5:1-1000:1 and more preferably 2:1-10:1.

Electrodes may be positioned in various ways to achieve a desired spacing between the electrodes. For example, a first electrode may be positioned such that its longest dimension is substantially parallel to the longest dimension of a second electrode. In a further embodiment, a first electrode may be positioned such that its longest dimension is substantially perpendicular with respect to the longest dimension of a second electrode. Additionally, a first electrode may be positioned such that its longest dimension is at an angle between 0 and 90 degrees with respect to the longest dimension of a second electrode.

A cation exchange membrane is optionally disposed between an anode and a cathode in embodiments of a microbial fuel cell according to the present invention. A cation exchange membrane is permeable to one or more selected cations. Particularly preferred is a cation exchange membrane permeable to protons, a proton exchange membrane. Suitable proton exchange membrane materials include perfluorinated sulfonic acid polymers such as tetrafluoroethylene and perfluorovinylether sulfonic acid copolymers, and derivatives thereof. Specific examples include NAFION, such as NAFION 117, and derivatives produced by E.I. DuPont de Nemours & Co., Wilmington, Del.

A microbial fuel cell according to the present invention may be configured as a self-contained fuel cell in particular embodiments. Thus, for example, a quantity of a biodegradable substrate is included in the fuel cell and no additional substrate is added. In further options, additional substrate is added at intervals or continuously such that the fuel cell operates as a batch processor or as a continuous flow system.

Optionally, an inventive system is provided which includes more than one anode and/or more than one cathode. For example, from 1-100 additional anodes and/or cathodes may be provided. The number and placement of one or more anodes and/or one or more electrodes may be considered in the context of the particular application. For example, in a particular embodiment where a large volume of substrate is to be metabolized by microbial organisms in a reactor, a larger area of anodic surface may be provided. Similarly, a larger area of cathode surface may be appropriate. In one embodiment, an electrode surface area is provided by configuring a reactor to include one or more electrodes that project into the reaction chamber. In a further embodiment, an electrode surface area is provided by configuring the cathode as a wall of the reactor, or a portion of the wall of the reactor. The ratio of the total surface area of the one or more anodes to the total volume of the interior of the reaction chamber is in the range of about 10000:1-1:1, inclusive, square meters per cubic meter in particular embodiments. In further embodiments, the ratio is in the range of about 5000:1-100:1.

In a further embodiment, a wall of the reaction chamber includes two or more portions such as a structural portion and an electrode portion. A structural portion provides structural support for forming and maintaining the shape of the reaction chamber, as in a conventional wall. An electrode portion of a wall may provide structural support for the reaction chamber and in addition has a functional role in a process carried out in an inventive system. In such an embodiment, the structural portion and electrode portion combine to form a wall defining the interior of the reaction chamber. In a specific embodiment, the electrode portion of the wall includes the cathode. Further, a support structure for supporting an anode or cathode may be included in an electrode portion of the wall. Such a support structure may further provide structural support for forming and maintaining the shape of the reaction chamber A hydrogen gas collection system is optionally included in an inventive microbial fuel cell configured to produce hydrogen such that the hydrogen gas generated is collected and may be stored for use, or directed to a point of use, such as to a hydrogen fuel powered device.

For example, a hydrogen gas collection unit may include one or more hydrogen gas conduits for directing a flow of hydrogen gas from the cathode to a storage container or directly to a point of use. A hydrogen gas conduit is optionally connected to a source of a sweep gas. For instance, as hydrogen gas is initially produced, a sweep gas may be introduced into a hydrogen gas conduit, flowing in the direction of a storage container or point of hydrogen gas use. For instance, a hydrogen collection system may include a container for collection of hydrogen from the cathode. A collection system may further include a conduit for passage of hydrogen. The conduit and/or container may be in gas flow communication with a channel provided for outflow of hydrogen gas from the reaction chamber. Typically, the conduit and/or container are in gas flow communication with the cathode, particularly where the cathode is a gas cathode.

An aqueous medium in a reaction chamber of a microbial fuel cell is formulated to be non-toxic to bacteria in the fuel cell. Further, the medium or solvent may be adjusted to a be compatible with bacterial metabolism, for instance by adjusting pH to be in the range between about pH 3-9, preferably about 5-8.5, inclusive, by adding a buffer to the medium or solvent if necessary, and by adjusting the osmolarity of the medium or solvent by dilution or addition of a osmotically active substance. Ionic strength may be adjusted by dilution or addition of a salt for instance. Further, nutrients, cofactors, vitamins and other such additives may be included to maintain a healthy bacterial population, if desired, see for example examples of such additives described in Lovley and Phillips, Appl. Environ. Microbiol., 54(6):1472-1480.

In operation, reaction conditions include variable such as pH, temperature, osmolarity, and ionic strength of the medium in the reactor. In general, the pH of the medium in the reactor is between 3-9, inclusive, and preferably between 5-8.5 inclusive.

Reaction temperatures are typically in the range of about 10-40° C. for non-thermophilic bacteria, although the device may be used at any temperature in the range of 0 to 100 deg C. by including suitable bacteria for growing at selected temperatures. However, maintaining a reaction temperature above ambient temperature may require energy input and it is preferred to maintain the reactor temperature at about 15-25° C. without input of energy. A surprising finding of the present invention is that reaction temperatures in the range of 16-25° C., inclusive or more preferably temperatures in the range of 18-24° C., inclusive and further preferably in the range of 19-22° C., inclusive, allow hydrogen generation, electrode potentials, Coulombic efficiencies and energy recoveries comparable to reactions run at 32° C. which is generally believed to be an optimal temperature for anaerobic growth and metabolism, including oxidation of an organic material.

Ionic strength of a medium in a reactor is preferably in the range of 50-500 millimolar, more preferably in the range of 75-450 millimolar inclusive, and further preferably in the range of 100-400 millimolar, inclusive.

A channel is included defining a passage from the exterior of the reaction chamber to the interior in particular embodiments. More than one channel may be included to allow and/or regulate flow of materials into and out of the reaction chamber. For example, a channel may be included to allow for outflow of a gas generated at the cathode. Further, a channel may be included to allow for outflow of a gas generated at the anode.

In a particular embodiment of a continuous flow configuration, a channel may be included to allow flow of a substance into a reaction chamber and a separate channel may be used to allow outflow of a substance from the reaction chamber. More than one channel may be included for use in any inflow or outflow function.

A regulator device, such as a valve, may be included to further regulate flow of materials into and out of the reaction chamber. Further, a cap or seal is optionally used to close a channel. For example, where a fuel cell is operated remotely or as a single use device such that no additional materials are added, a cap or seal is optionally used to close a channel.

A pump may be provided for enhancing flow of liquid or gas into and/or out of a reaction chamber.

FIG. 1 illustrates an embodiment of an inventive system at 100. In this illustration, a reaction chamber is shown having a wall 105 defining an interior and exterior of the reaction chamber, and fluid, such as an aqueous medium in the interior of the reaction chamber, the fluid level shown at 106. A solid biodegradable substrate 107 is present in the anode chamber. An anode is shown at 112 and a cathode is shown at 116. A space 108 between the electrodes is further depicted. An optional PEM or filter is shown at 114 positioned between the anode 112 and cathode 116. A conduit for electrons 117 is shown along with a connected load or power source shown at 118. An optional channel which is an outlet for a cathode gas is shown at 120 and a channel which may serve as an inlet for an aqueous medium containing an organic substance oxidizable by the anodophilic bacteria is shown at 122. It is appreciated that the channel 122 may also serve as an outlet for anode gas, such as $CO_2$ or hydrogen. Anodophilic bacteria 103 are illustrated in contact with the anode 112.

It is appreciated that fermentation of biodegradable substrates by bacteria produces hydrogen. This bacterially produced hydrogen is optionally captured as a desirable product of an inventive fuel cell. Thus, for example, bacterially produced hydrogen gas is eluted from an anode chamber in a two chamber fuel cell or from the reaction chamber in a single chamber system.

Figure 2:
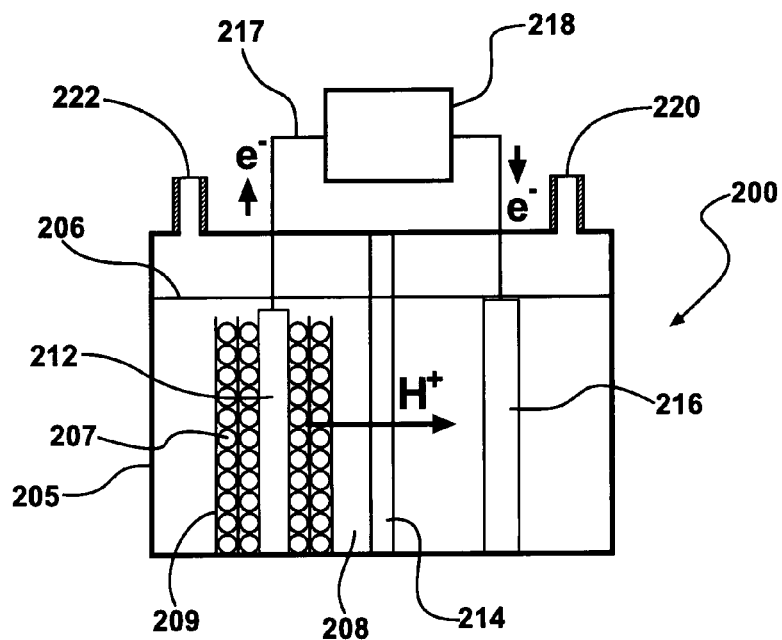
FIG. 2 is an image illustrating an embodiment of a microbial fuel cell, showing two chambers separated by a cation exchange membrane and a solid substrate in a container disposed in the anode chamber.

FIG. 2 illustrates an embodiment of an inventive system at 200. In this illustration, a reaction chamber is shown having a wall 205 defining an interior and exterior of the reaction chamber, and fluid, such as an aqueous medium in the interior of the reaction chamber, the fluid level shown at 206. A solid biodegradable substrate 207 is present in the anode chamber in a container 209. An anode is shown at 212 and a cathode is shown at 216. A space 208 between the electrodes is further depicted. An optional PEM or filter is shown at 214 positioned between the anode 212 and cathode 216. A conduit for electrons 217 is shown along with a connected load or power source shown at 218. An optional channel which is an outlet for a cathode gas is shown at 220 and a channel which may serve as an inlet for an aqueous medium or other substance is shown at 222.

It is appreciated that the biodegradable substrate may be place randomly throughout the anode chamber in a two chamber system or randomly throughout the reaction chamber in a single chamber system. Alternatively, the biodegradable substrate may be placed on the base of the reaction chamber or at another location in the anode chamber or single chamber system.

Figure 3:
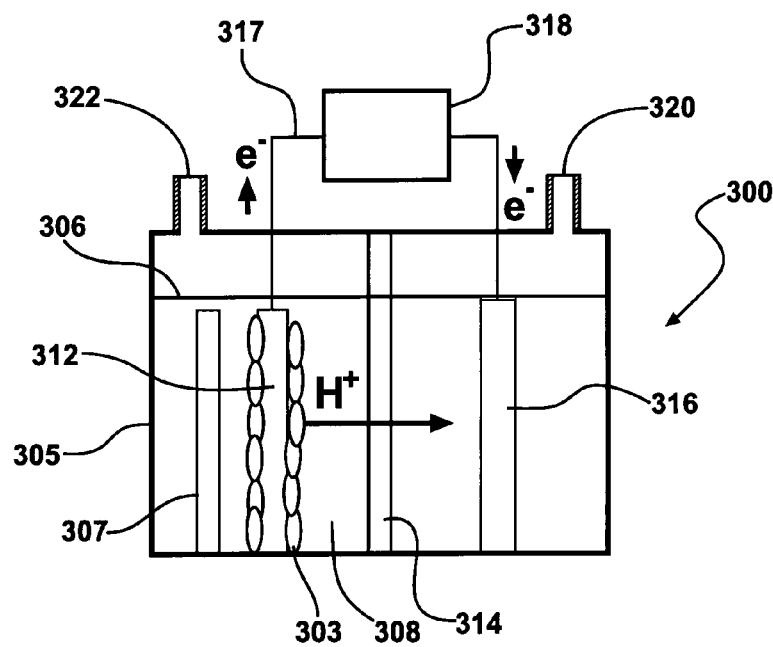
FIG. 3 is an image illustrating an embodiment of a microbial fuel cell, showing two chambers separated by a cation exchange membrane and a solid substrate disposed in the anode chamber.

FIG. 3 illustrates an embodiment of an inventive system at 300. In this illustration, a reaction chamber is shown having a wall 305 defining an interior and exterior of the reaction chamber, and fluid, such as an aqueous medium in the interior of the reaction chamber, the fluid level shown at 306. A solid biodegradable substrate 307 is present in the anode chamber in the form of a slab or brick-shape. An anode is shown at 312 and a cathode is shown at 316. A space 308 between the electrodes is further depicted. An optional PEM or filter is shown at 314 positioned between the anode 312 and cathode 316. A conduit for electrons 317 is shown along with a connected load or power source shown at 318. An optional channel which is an outlet for a cathode gas is shown at 320 and a channel which may serve as an inlet for an aqueous medium or other substance is shown at 322.

Figure 4:
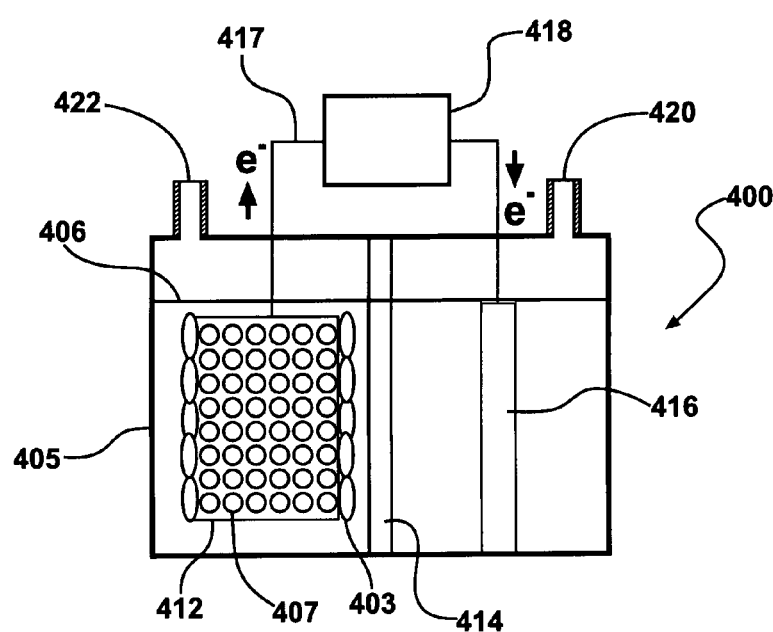
FIG. 4 is an image illustrating an embodiment of a microbial fuel cell, showing two chambers separated by a cation exchange membrane and a solid substrate in a container disposed in the anode chamber.

FIG. 4 illustrates an embodiment of an inventive system at 400. In this illustration, a reaction chamber is shown having a wall 405 defining an interior and exterior of the reaction chamber, and fluid, such as an aqueous medium in the interior of the reaction chamber, the fluid level shown at 406. A solid biodegradable substrate 407 is present in the anode chamber in a container formed by an anode material 412. A cathode is shown at 416. A space 408 between the electrodes is further depicted. An optional PEM or filter is shown at 414 positioned between the anode 412 and cathode 416. A conduit for electrons 417 is shown along with a connected load or power source shown at 418. An optional channel which is an outlet for a cathode gas is shown at 420 and a channel which may serve as an inlet for an aqueous medium or other substance is shown at 422.

Figure 5:
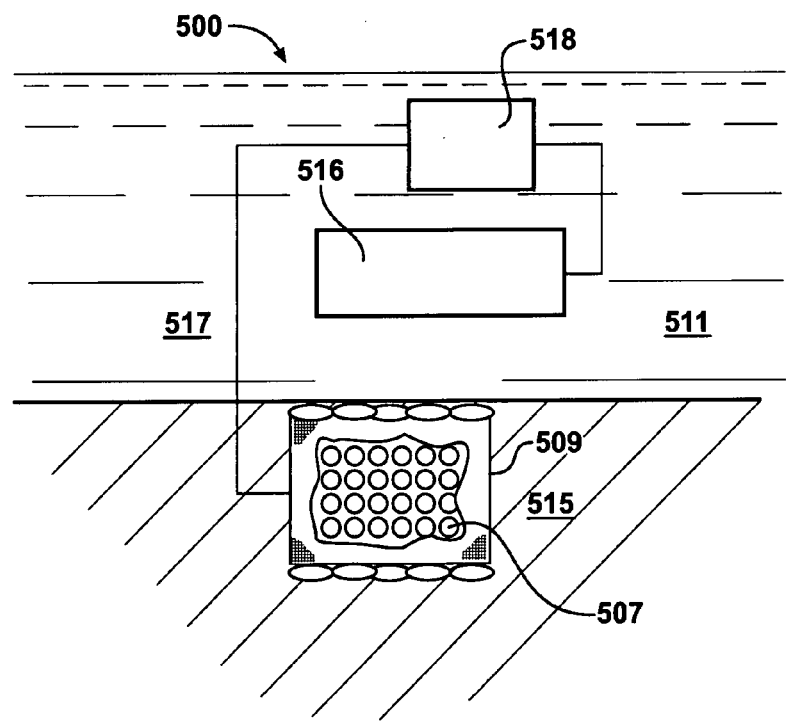
FIG. 5 is an image illustrating an embodiment of a sediment/seawater microbial fuel cell, showing a solid substrate in a conductive container serving as the anode immersed in an anaerobic environment, sediment, and a cathode disposed in an oxygenated environment, seawater.

FIG. 5 illustrates an embodiment of an inventive sediment fuel cell system at 500. In this illustration, the anode 509 contains particles of a solid biodegradable substrate 207. The anode 507 is shown immersed in sediment 515. A cathode is shown at 516 positioned in oxygenated seawater 511. A conduit for electrons 517 is shown along with a connected load 518.

Figure 6:
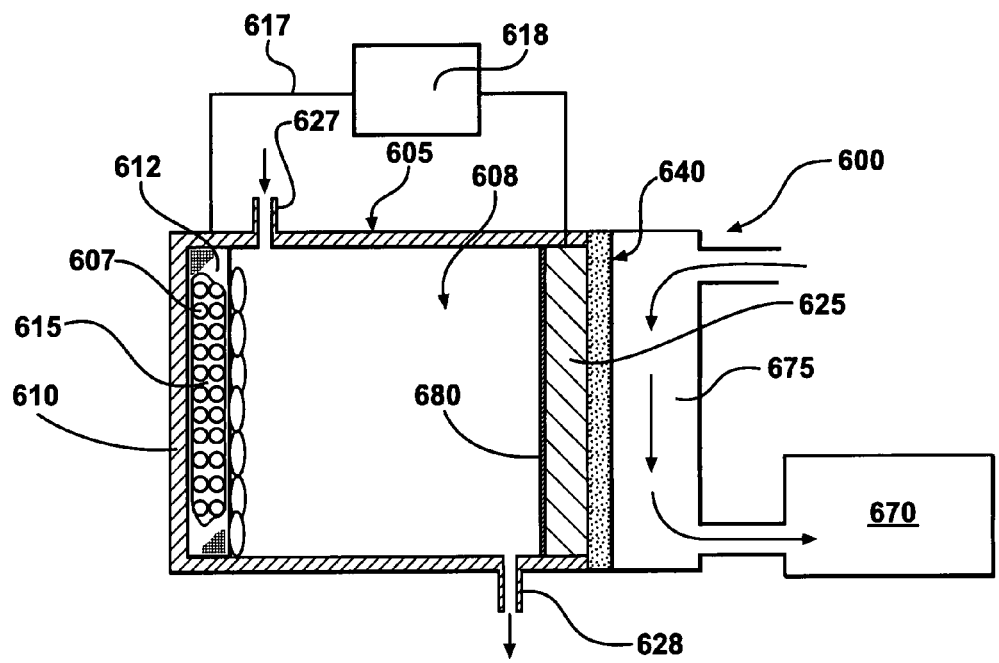
FIG. 6 is an image illustrating an embodiment of a single chamber bioelectrochemically assisted microbial fuel cell including a solid substrate in a container at the anode, an air cathode and configured to capture produced hydrogen.

FIG. 6 shows an inventive system in which a longest dimension of an anode and a cathode are oriented parallel with respect to each other. An inventive system 600 including a wall 605 of a reaction chamber having an interior volume 608, a support structure for an anode 610 which also forms a portion of a wall of the reaction chamber, and a support for a cathode 640 which may also be a cathode diffusion layer, for instance where a gas cathode is employed as in this example, which is porous to hydrogen and which also forms a portion of a wall of the reaction chamber. An anode 612 and a cathode 625 are shown in contact with support structures 610 and 640 respectively. The anode 612 forms a container for a biodegradable substrate 607. A cathode protective layer 680 is shown in the interior volume of the reaction chamber 608 in contact with a surface of the cathode 625. A space between the anode 612 and cathode 625 is shown in the interior of the reaction chamber. In this configuration the anode 612 and cathode 625 each have a long dimension and are positioned relative to each other such that the long dimensions are parallel. A first channel 627 depicted as an inlet channel and a second channel 628 depicted as an outlet channel are shown. A conduit 617 for electrons connecting the anode and cathode, and a power supply or load 618 are each included in this illustration of an inventive system. A hydrogen collection system is depicted which is optionally provided in a hydrogen generation embodiment including a passageway for gases 675, such as for a sweep gas and hydrogen, is illustrated along with a collection container for hydrogen 670.

FIG. 7A illustrates an anode 700 which can be configured to form a container for a biodegradable substrate 707. A rod 710 of an anode material, such as graphite, is attached to a piece of flexible conductive anode material 712, such as graphite cloth or granules. Biodegradable substrate 707 is disposed on the piece of flexible conductive anode material 712 or placed in the bed of granules.

FIG. 7B illustrates a top view of an anode 700 configured to form a container for a biodegradable substrate 707. The unfurled piece of flexible conductive anode material 712 shown in FIG. 7A is shown wound around the rod 710 such that the biodegradable substrate 707 is held in place by the porous container 712.

In further embodiments, a graphite rod is fitted into a graphite plate cored to hold the rod, forming the central anode. Multiple rods are configured in this way, so that a series of rolled anodes form the anode structure.

FIG. 8 illustrates a partial breakaway view of an anode configuration 800 including three slab, or brick-shaped, biodegradable substrate structures 807 positioned between slabs of anode material 812.

FIG. 9 shows an anode configuration 900 in which a container 912 including a conductive anode material, such as conductive carbon cloth contains a biodegradable substrate, here pictured as solid particles 907.

In a further option, a graphite brush electrode is used in a particular configurations of a substrate enhanced fuel cell.

Embodiments of inventive compositions and methods are illustrated in the following examples. These examples are provided for illustrative purposes and are not considered limitations on the scope of inventive compositions and methods.

EXAMPLES

Substrates. Chitin is a polysaccharide of N-acetyl-β-D-glucosamine ($C_8H_{13}NO_5$), and it is the second most abundant material in the world after lignocellulose. It is widely available as a seafood industry byproduct in coastal areas and is readily degraded by marine bacteria. Depending on the particle size, pretreatment method, and exact chemical composition, i.e. the ratio of rapidly to slowly degradable fractions, different forms of chitin can be used. In this example ChitoRem™ SC-20 (Chitin 20) and ChitoRem™ SC-80 (Chitin 80) are used as received (JRW Bioremediation, LLC, from Lenexa, Kans., USA). The Chitin 20 preparation consisted of crushed crab shells containing approximately 20% chitin, 25% protein, 40% calcium carbonate, and 15% water. The Chitin 80 preparation was composed of deproteinized and demineralized crab shells containing approximately 95% chitin which were sieved to a particle size less than 20 mesh (<841 μm). Chitin 20 is more easily degraded than Chitin 80 due to its higher protein content. Cellulose particles were tested as received, with a diameter of 50 μm as specified by the manufacturer (Sigmacell® cellulose, type 50 particle size, Sigma Aldrich).

Electrodes. The anode was made of plain carbon cloth (30% wet-proofing) (E-TEK, Somerset, N.J., USA) connected to an external circuit using a titanium wire (0.81 mm diameter, 99.7%, Sigma-Aldrich, St. Louis, Mo., USA). Carbon cloth (5 cm by 9 cm, total projected surface area of $A_{an}$=0.0045 m$^2$) was sewn together in the shape of a pillow (3 cm by 5 cm final size) and filled with 2 g of a particulate substrate, or left empty (control). The pillow-shaped anode was sewn closed and wrapped with titanium wire to connect it to the external circuit. The cathode was made of carbon paper (2 cm×5 cm, projected surface area of $A_{cat}$0.001 m$^2$) containing 0.35 mg/cm$^2$ of Pt on one side (10% of Pt/C catalyst, 30% wet-proofing) (E-TEK, Somerset, N.J., USA).

Medium. Natural seawater (Real Ocean Pure Seawater, PETCO.com) was amended with a phosphate buffer and nutrients (NH$_4$Cl, 0.31 g/L; NaH$_2$PO$_4$.H$_2$O, 0.75 g/L) in order to ensure that nutrient limitations or pH changes did not affect power generation. Other nutrients and trace elements were assumed be available in the sediment or seawater. An anaerobic sediment from the Delaware Bay with an organic matter content of 4.8±0.42% was combined with standard sand, sieved to a uniform size (~0.5 millimeters), in a 1:1 ratio.

SEM Construction and Operation. SEM Reactors (Kimax*GL 45 Media/Storage Bottle; 500 mL capacity) were filled with 250 mL of a 50:50 mixture of sediment and sand mixture, and 250 mL of seawater. The anode was placed at the bottom of the bottle and connected to the cathode using a copper wire sealed with plastic tubes. The circuit was completed using a 1000Ω resistor as a load, with the voltage monitored across the resistor every 30 minutes using a data logger (ADC-16, Pico Technology Ltd). Tests were run in triplicate with a single, non-amended control reactor. Deionized water was added to the reactors to replace water lost to evaporation.

Two-Chamber MFC tests. Additional tests were performed using two-chambered MFCs to examine performance of these particulate substrates under conditions typically used for conventional (soluble) substrates. Particulate substrates (1 g/L) were added to media containing the following (g/L): NH$_4$Cl, 0.31; KCl, 0.13; NaH$_2$PO$_4$, H$_2$O, 4.97; Na$_2$HPO$_4$, H$_2$O, 2.75; and a mineral (12.5 mL) and vitamin (12.5 mL) solution as described in Lovley, D. R. et al., *Appl. Environ. Microbiol* 1988, 54, 1472-1480. Anaerobic sludge (secondary clarifier) obtained from the Pennsylvania State University Wastewater Treatment Plant was used to inoculate these reactors. The two-chamber reactors were constructed as previously described using two media bottles (200 mL capacity) with side arms including an open tube projecting from the side of each container, with a Nafion membrane (Nafion 117, Dupont Co., Delaware; projected surface area of 0.001 m$^2$) clamped between the ends of the two tubes, forming a tube that can allow protons to move from the anode chamber to the cathode chamber. A graphite brush was used as the anode (25 mm diameter×25 mm length, $A_{an}$=0.22 m$^2$) (PANEX® 33 160K, Zoltek, St. Louis, Mo., USA) (16). The cathode was 1 cm×9.5 cm carbon paper containing 0.35 mg/cm$^2$ Pt (10% of Pt/C catalyst, 30% wet-proofing; E-TEK, Somerset, N.J., USA) coated on one side ($A_{cat}$=0.00095 m$^2$).

Analytics and Calculations. Volatile fatty acids (VFAs) were measured using a gas chromatograph (GC) (Agilent, 6890) as described in Oh, S.-E. et al., *Environ. Sci. Technol.* 2004, 38, 4900-4904. The concentration of organic matter in the marine sediment was measured as volatile solids (VS), based on differences in dry weight (110° C. for 48 hr) and combusted weight (550° C. for 8 h) for ten samples (10 g each). Solution conductivity was measured using a conductivity meter (OAKTON, CON6, Acron series), and kept between 20-30 mS/cm (except as noted) as solution conductivity affects power density.

Cell voltages (V) were measured using a data acquisition system (Pico-ADC 16, Alison Technology Corporation, Kingsville, Tex.) connected to a computer. Anode/cathode potentials were measured using a multimeter (83 μm, Fluke, USA) using an Ag/AgCl reference electrode (RE-SB, Bioanalytical systems, USA). Current (i) was calculated as i=V/R, where R is the external circuit resistance. Power (P) was calculated as P=iV, and normalized by one side of the indicated projected cathode area ($A_{cat}$). The maximum power density was measured by varying the external resistance between 100Ω and 200 kΩ, and waiting until voltage was stable (~30 minutes).

The total remaining substrate at the end of a test could not be directly measured due to the organic matter content of the inoculum. Therefore, coulombic efficiencies (CEs) were estimated by assuming that all substrate was completely degraded when the voltage was reduced to a low value (around 10 mV). CEs were calculated as described in Oh, S.-E. et al., Environ. Sci. Technol. 2004, 38, 4900-4904, assuming 32 moles of electrons produced per mole of chitin, and 24 moles of electrons produced per mole of cellulose.

Power Generation with Chitin. Power generation was observed with little lag with both chitin substrates, reaching a maximum stable power density within 80 hours (FIG. 10). FIG. 10 shows power generation from a sediment microbial fuel cell with Chitin 20 and Chitin 80 as substrate as well as a control (without substrate). Each line represents the average of three reactors. Error bars are S.D. Symbols are shown for each 10 data points and standard deviations are shown for each 50 data points. Average power densities during maximum power production (from 54 to 290 hours) in three reactors with Chitin 80 were 90±4, 75±7, and 60±5 mW/m$^2$ (n=470 for each reactor). For the combined reactors, the average maximum power density produced using Chitin 80 was 76±15 mW/m$^2$. Power densities from the control reactors lacking substrate amendments were below <2 mW/m$^2$.

With Chitin 20 as the substrate, average power densities for the three reactors were 94±6, 56±4, and 41±6 mW/m$^2$ (n=513, from 43 hr to 290 hr). Taken together, the power generation for these three reactors averaged 64±27 mW/m$^2$.

Figure 11:
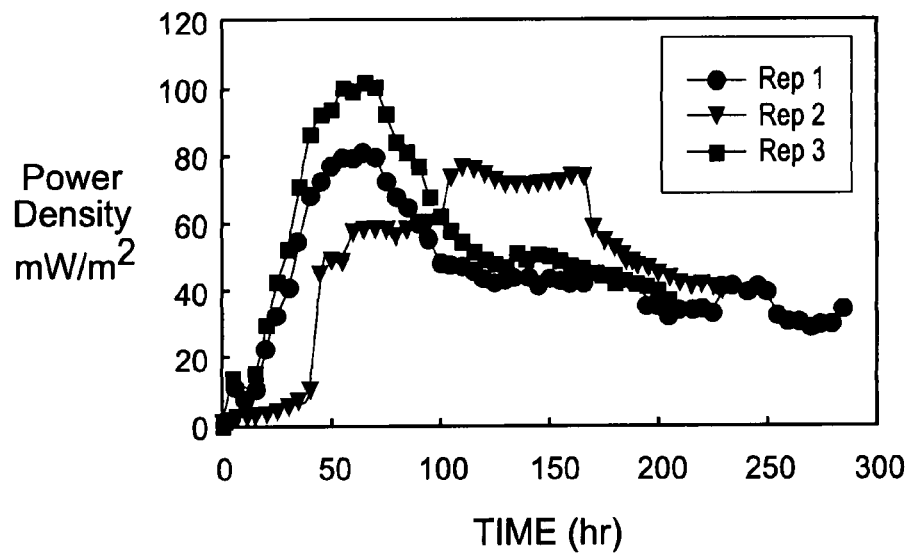
FIG. 11 is a graph showing power generation from three replications of substrate-enhanced sediment microbial fuel cells with cellulose as a solid substrate for bacterial metabolism.

Power Generation with Cellulose. FIG. 11 shows power generation from three replications of substrate-enhanced fuel cells using cellulose as substrate The maximum power generation for the first reactor reached 98±2 mW/m$^2$ (n=46, 50 to 73 hr), and was significantly greater (p=0.004, 95% CI) than power produced by the other two reactors of 73±4 mW/m$^2$ (n=140, 100 to 170 hr) and 78±3 mW/m$_2$ (n=52, 50 to 76 hr), attributed to the efficiency of the catalyst in one reactor. When the cathode from the reactor that had produced a maximum of 98 mW/m was hooked to the reactor that had produced a maximum of 73 mW/m$^2$, power immediately increased (in this case from 9 to 42 mW/m$^2$). A comparison of the results from the two chitin substrates and cellulose substrate showed that maximum power densities using the different substrates was significantly different (p=0.001, 95% CI).

Figure 12A:
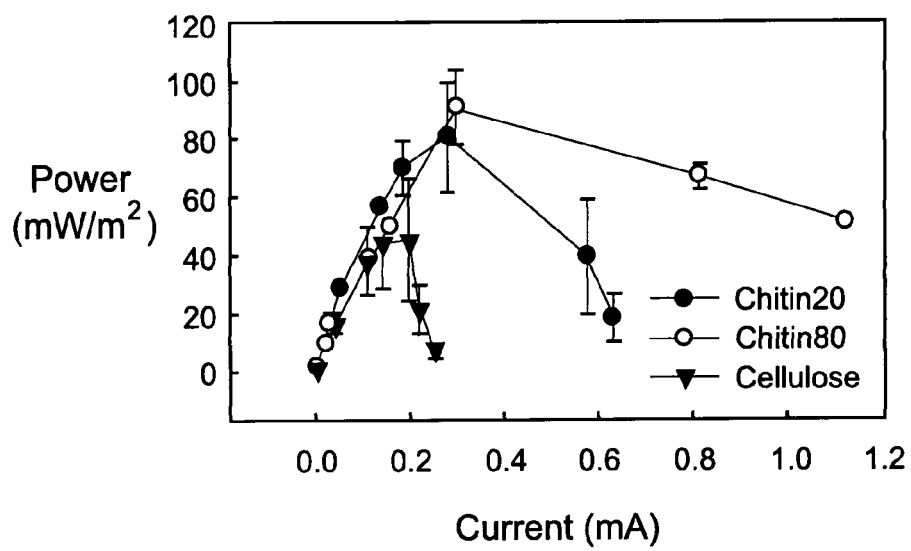
FIG. 12A is a graph showing power density based on different resistance for three different solid substrates.
Figure 12B:
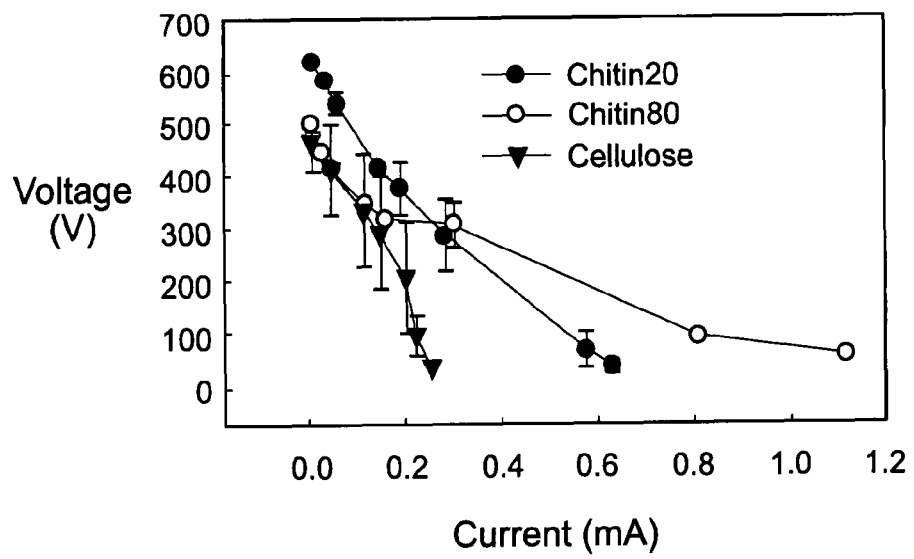
FIG. 12B is a graph showing voltage based on different resistance for three different solid substrates.

Polarization and Power Density Curves. FIG. 12A shows power density based on different resistance for all substrates. Error bars are ±S.D. based on duplicate measurements. Polarization data were obtained by varying the circuit external resistance (FIG. 12A). Data were obtained during start up when power in the three reactors was 86 mW/m$^2$ (Chitin 20), 91 mW/m$^2$ (Chitin 80) and 50 mW/m$^2$ (cellulose) with a 1000Ω resistor. Power density curves where then calculated based on the voltages and current. FIG. 12B shows voltage based on different resistance for all substrates. Error bars are ±S.D. based on duplicate measurements. Maximum power densities reflected these general differences in power production, with 87±10 mW/m$^2$ and 80±19 mW/m$^2$ for Chitin 80 and Chitin 20, and 45±21 mW/m$^2$ for cellulose (FIG. 12B).

The internal resistance calculated based on using the slope of polarization curve indicates that power generation was limited by internal resistance. Over a range of 0.002 to 0.6 mA (FIG. 12B), the internal resistances from two reactors of each treatment were calculated as 646±134Ω and 1297±442Ω for the Chitin 80 and Chitin 20 substrates, and 1762±901Ω for cellulose substrate. Differences in cathode potentials in the reactors containing Chitin 20 and cellulose likely account for the large standard deviation among reactors in internal resistance. The average power production in these reactors was in general inversely correlated with internal resistance (p=0.01 the slope, n=5; data not shown), showing that internal resistance variations among reactors produced differences in power densities. Except for the situations noted above for the cathode, these differences were a consequence of the biological development of power generation with the particulate substrates.

Volatile Fatty Acids (VFAs). The degradation of chitin and cellulose requires hydrolysis of the particulate substrate, and this degradation step could result in diffusion of the substrate out of the sediment and its accumulation in the overlying water. However, VFAs measured in the overlying water of the anode chamber in the SEM reactors were all less than 10 ppm, indicating little accumulation of these components in the overlying water, and showing that these are used as a source of electricity generation by anodophilic bacteria.

Figure 13:
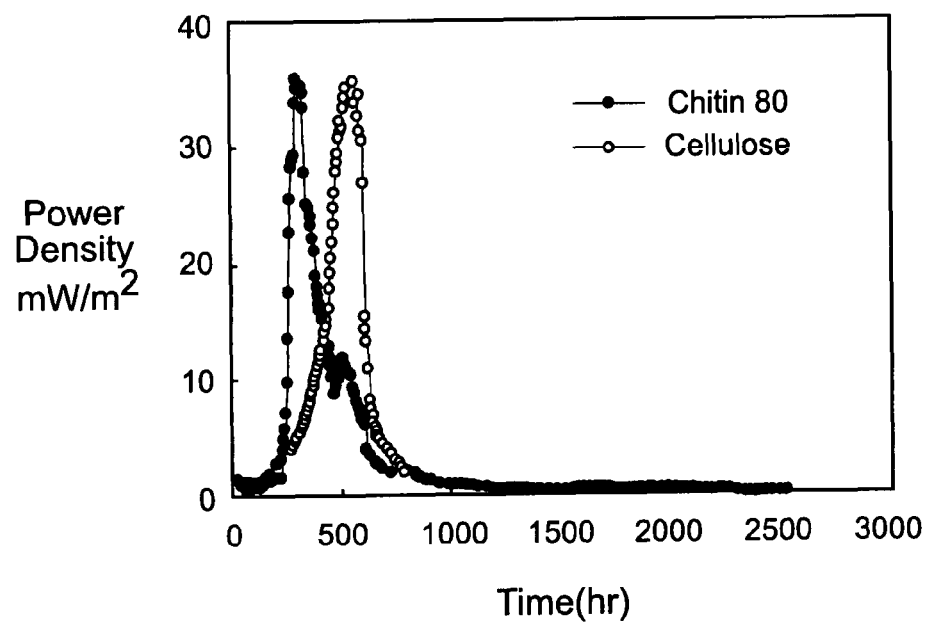
FIG. 13 is a graph showing power generation in a two-chamber microbial fuel cell using 1 g/L Chitin 80 or 1 g/L cellulose as a solid substrate.

Power Generation in a Two-Chambered MFC. The power generated using two of the particulate substrates (Chitin 80 and cellulose) was further examined in a two-chamber MFC that has previously been tested with soluble substrates. FIG. 13 shows power generation in a two-chamber MFC with Chitin 80 or cellulose (1 g/L). The time to peak power production for the Chitin 80 and cellulose required substantially longer time for the two chamber system (320 or 577 hours) than with the SEMs (57 or 60 hours). Power production with a 1000Ω resistor reached a maximum of ~35 mW/m$^2$ for both substrates (FIG. 13). These maximum power densities are slightly lower than that achieved in this system using acetate (45 mW/m$^2$), but similar to that obtained with glucose (37 mW/m$^2$), suggesting the rate of power generation with these substrates was limited more by internal resistance of the MFC than by substrate degradation kinetics. The CE for the two substrates was 10% for cellulose and 13% for Chitin 80. However, we cannot be certain that all the particulate substrate was fully degraded. These CEs are substantially lower than those measured using soluble substrates of 22% for glucose and 53% using acetate.

The lifetime of a substrate-enhanced fuel cell can be calculated on the basis of mass density of a slowly dissolving compound. For example, if the goal for power performance of a substrate-enhanced fuel cell is to achieve 10 W/m$^3$, the lifetime calculation for a cubic meter of polylactide is calculated Assuming polylactide with a density of 1.3 kg/L, with an energy content of 1.08 g-BOD/L, and assuming 0.25 kg-BOD/kWh (based on 3.5 gBOD/kcal with a conversion factor of 860 kcal/kWh). For this desired energy density, the lifetime, T, for complete degradation of the substrate:

$$T = \frac{m^3}{10W} \times 1\frac{kg}{L} \times 1\frac{kWh}{0.25\,gBOD} \times 10^3 \frac{L}{m^3} \times 10^3 \frac{W}{kW} \times \frac{yr}{24 \times 365\,h} = 46\,yr$$

A higher output of power reduces the lifetime of the material. For example, if we desired to increase the power density to 100 W/m$^3$, the material would last 10 years.

Any patents or publications mentioned in this specification are incorporated herein by reference to the same extent as if each individual publication is specifically and individually indicated to be incorporated by reference.

The compositions and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:
1. A microbial fuel cell, comprising:
   a housing an anode at least partially disposed in the housing;
   a cathode at least partially disposed in the housing;
   an electrically conductive connector connecting the anode and the cathode;
   a solid form of a biodegradable organic substrate, the solid form of a biodegradable organic substrate fully enclosed and retained in a package porous to bacteria, the package disposed in the housing.
2. The microbial fuel cell of claim 1, wherein at least a portion of the package is electron conductive and forms at least a portion of an anode.
3. The microbial fuel cell of claim 2, wherein the package comprises a material selected from the group consisting of: carbon paper, carbon cloth, carbon felt, carbon wool, carbon foam, graphite, porous graphite, graphite powder, graphite granules, graphite fiber, a conductive polymer, a conductive metal, and a combination of any of these.
4. The microbial fuel cell of claim 1, wherein the substrate is a biodegradable polymer.
5. The microbial fuel cell of claim 4, wherein the polymer is a polysaccharide.
6. The microbial fuel cell of claim 5 wherein the polymer is a biodegradable plastic.
7. The microbial fuel cell of claim 4 wherein the biodegradable polymer is substantially insoluble in an aqueous medium.

* * * * *